United States Patent
Hashiguchi et al.

(10) Patent No.: US 8,345,538 B2
(45) Date of Patent: Jan. 1, 2013

(54) APPARATUS AND METHOD FOR FINDING A PAIR OF DISJOINT PATHS IN A COMMUNICATION NETWORK

(75) Inventors: Tomohiro Hashiguchi, Kawasaki (JP);
Toru Katagiri, Kawasaki (JP);
Kazuyuki Tajima, Kawasaki (JP);
Yutaka Takita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 359 days.

(21) Appl. No.: 12/853,336

(22) Filed: Aug. 10, 2010

(65) Prior Publication Data

US 2011/0038254 A1 Feb. 17, 2011

(30) Foreign Application Priority Data

Aug. 11, 2009 (JP) .................. 2009-186783

(51) Int. Cl.
*H04J 3/14* (2006.01)
*H04L 1/00* (2006.01)
*H04L 12/26* (2006.01)

(52) U.S. Cl. ........................................ 370/217
(58) Field of Classification Search ............ None
See application file for complete search history.

(56) References Cited

U.S. PATENT DOCUMENTS

| | | | |
|---|---|---|---|
| 6,744,727 B2* | 6/2004 | Liu et al. | 370/228 |
| 7,406,032 B2* | 7/2008 | Li et al. | 370/217 |
| 7,633,942 B2* | 12/2009 | Bearden et al. | 370/392 |
| 7,830,789 B2* | 11/2010 | Hashiguchi et al. | 370/222 |
| 7,929,428 B2* | 4/2011 | Fan et al. | 370/225 |
| 2009/0003198 A1* | 1/2009 | Hashiguchi et al. | 370/222 |

OTHER PUBLICATIONS

Bhandari, R. "Optical physical diversity algorithms and survivable networks", Proceedings of the 2nd IEEE Symposium on Computers and Communications (ISCC '97) Jul. 1997, pp. 433-441.

* cited by examiner

*Primary Examiner* — Hassan Phillips
*Assistant Examiner* — Prenell Jones
(74) *Attorney, Agent, or Firm* — Fujitsu Patent Center

(57) ABSTRACT

There is provided topology information including connection states among nodes in a network, and port information including restriction conditions on connectivity among ports within a restricted node. A path search apparatus finds a first path having the minimum total link-cost among a plurality of paths. The topology information is changed so that the first path is not searched for as a path having the minimum total link-cost among the plurality of paths, and the port information is changed based on a port connectivity change rule. Then, the path search apparatus finds a second path different from the first path, based on the changed port information and the changed topology information, and reconfigures a pair of link-disjoint paths satisfying the restriction conditions imposed on the restricted node, by removing a link shared by both the first and second paths from the original topology information.

15 Claims, 22 Drawing Sheets

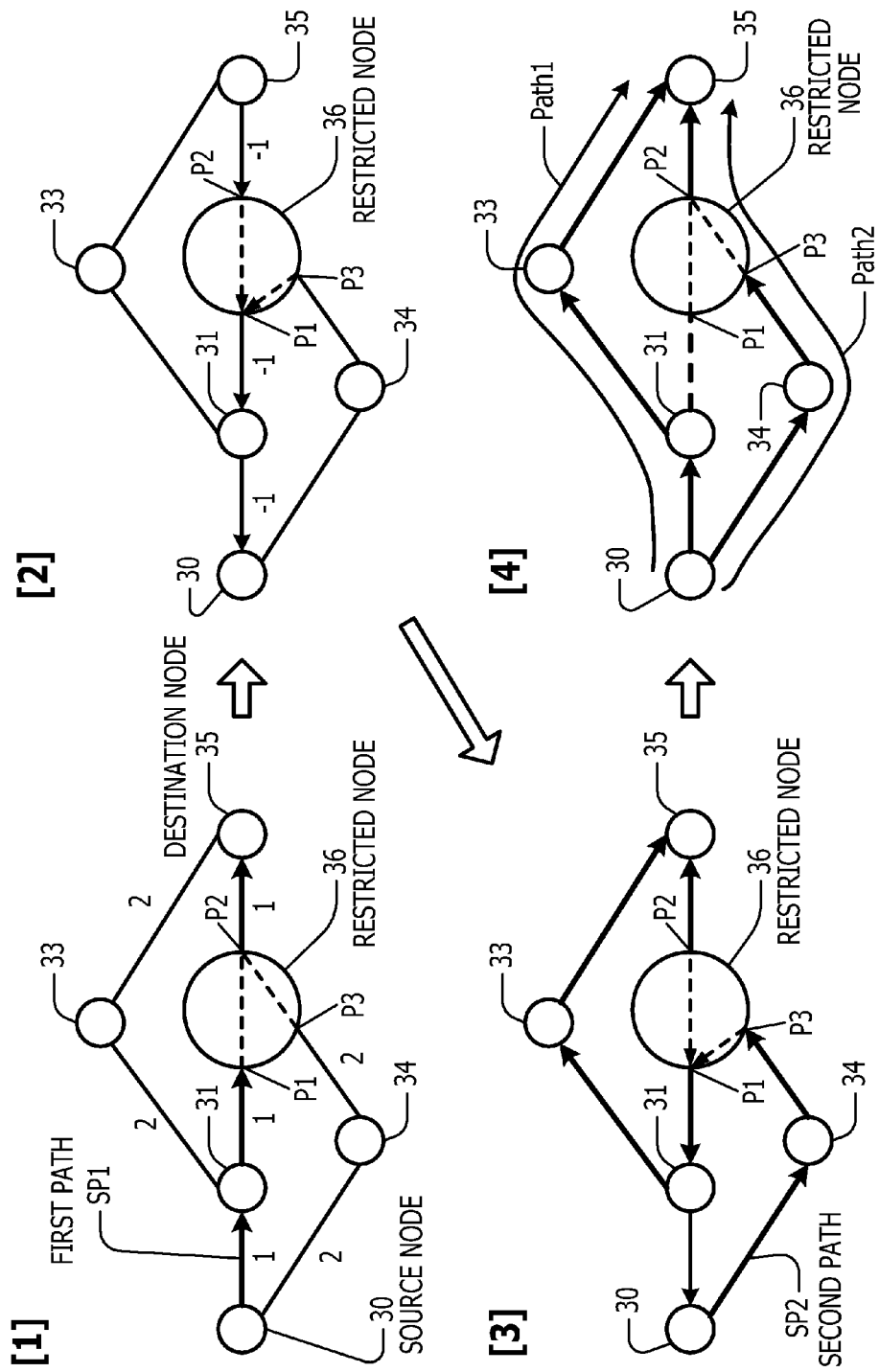

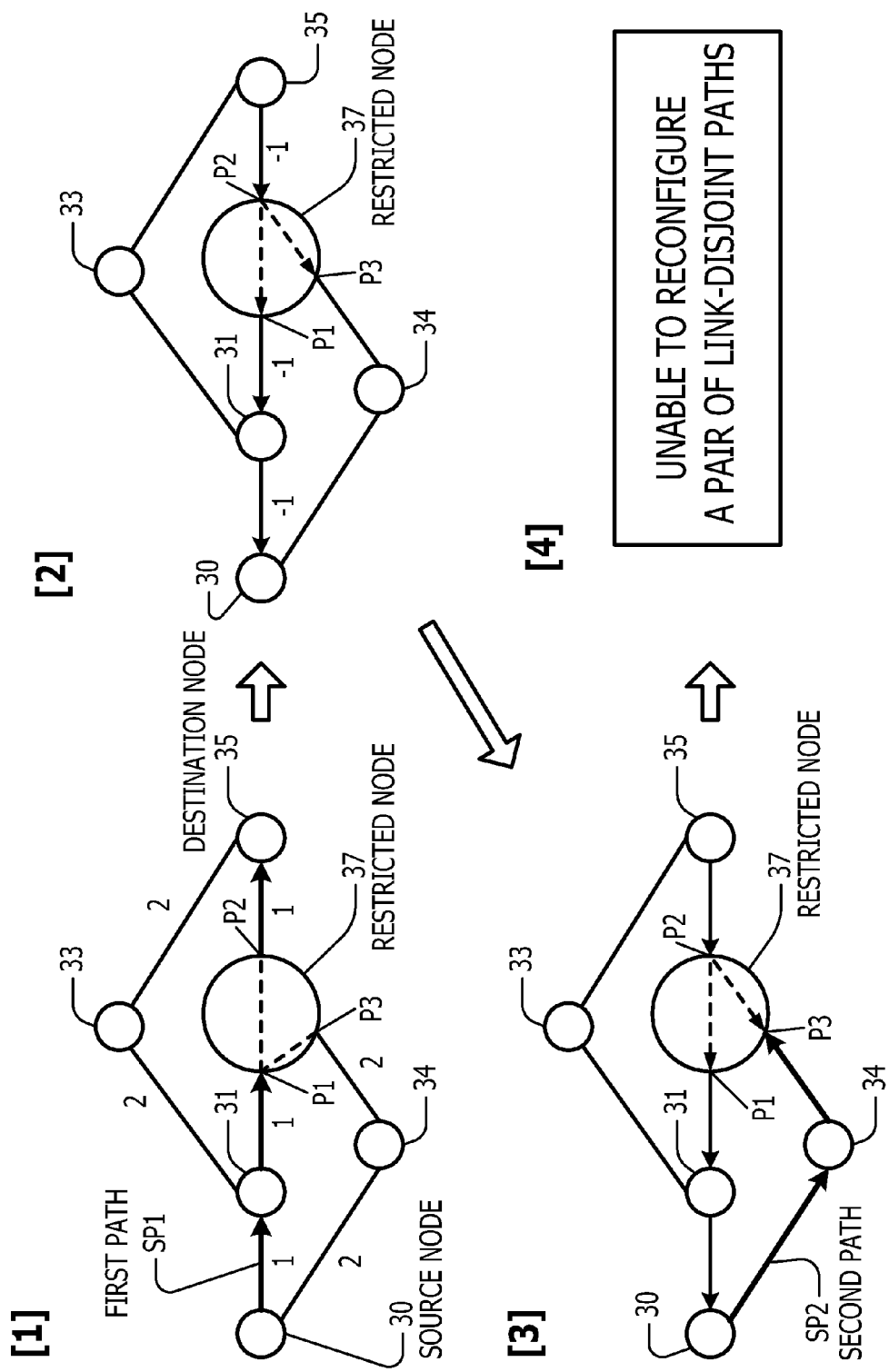

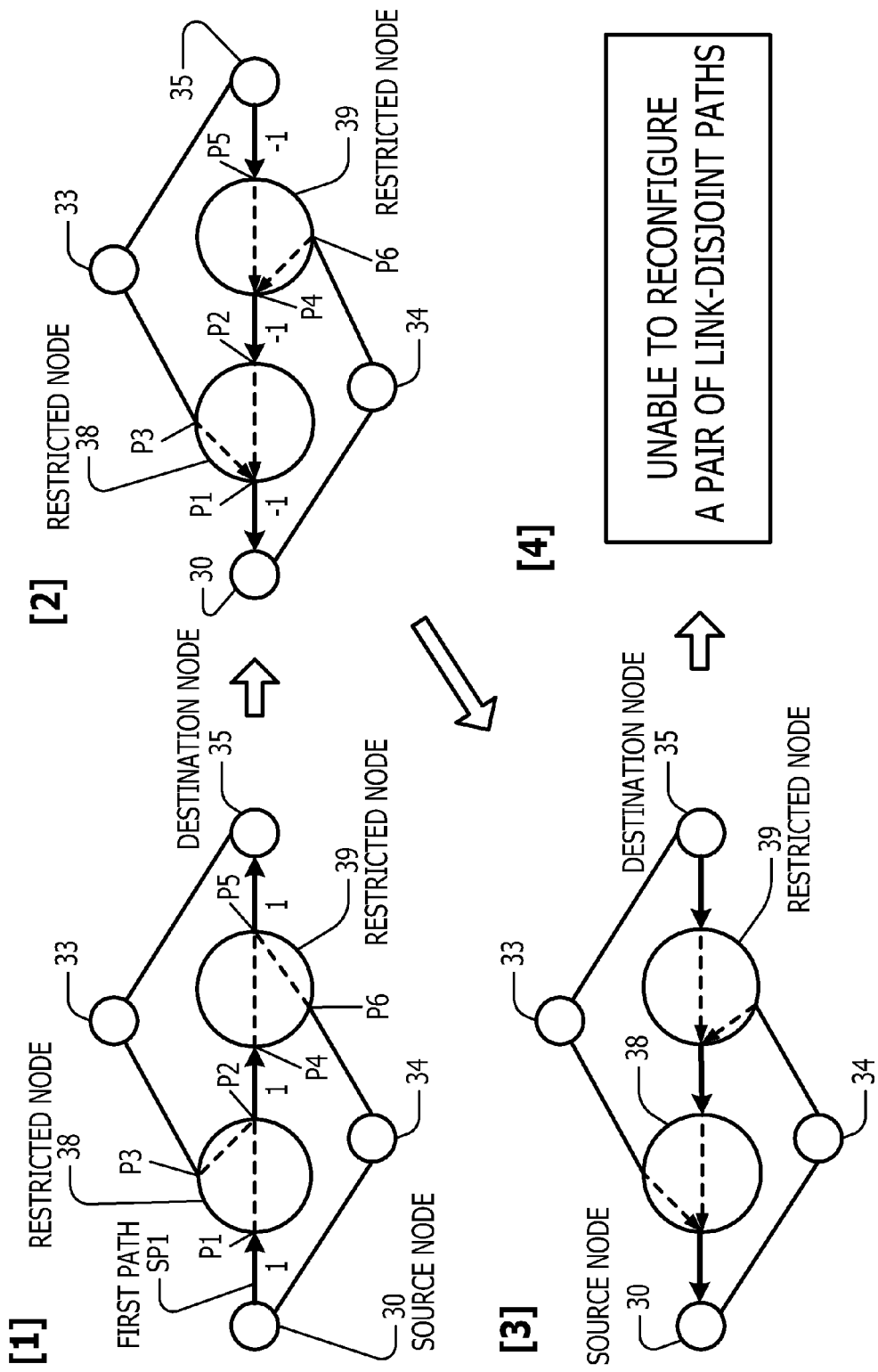

FIG. 4

TOPOLOGY INF STORAGE 50

| LINK ID ~501 | NODE 1 ~502 | NODE 2 ~503 | LINK-COST ~504 | DIRECTION ~505 |
|---|---|---|---|---|
| L1 | N1 (30) | N2 (31) | 1 | 0 |
| L2 | N1 (30) | N6 (34) | 2 | 0 |
| L3 | N2 (31) | N3 (36) | 1 | 0 |
| L4 | N2 (31) | N4 (33) | 2 | 0 |
| L5 | N3 (36) | N5 (35) | 1 | 0 |
| L6 | N3 (36) | N6 (34) | 2 | 0 |
| L7 | N4 (33) | N5 (35) | 2 | 0 |
| --- | --- | --- | --- | --- |

FIG. 5

FIRST PATH INF STORAGE 51

| FIRST PATH ID — 511 | NODE ARRANGEMENT — 512 | TOTAL COST — 513 |
|---|---|---|
| SP1 | N1 (30) → N2 (31) → N3 (36) → N5 (35) | 3 |

FIG. 6

PORT INF STORAGE 52

| RESTRICTED NODE ID — 521 | PORT CONNECTION — 522 | NODE1 — 523 | NODE2 — 524 | CONNECTION CONDITION — 525 |
|---|---|---|---|---|
| N3 (36) | P1 – P2 | N2 (31) | N5 (35) | 0 |
|  | P1 – P3 | N2 (31) | N6 (34) | 0 |
|  | P2 – P3 | N5 (35) | N6 (34) | 3 |
| --- | --- | --- | --- | --- |

FIG. 7

SECOND PATH INF STORAGE 53

| SECOND PATH ID | NODE ARRANGEMENT | TOTAL COST |
|---|---|---|
| SP2 | N1 (30) → N6 (34) → N3 (36) → N2 (31) → N4 (33) → N5 (35) | 7 |

FIG. 8

DISJOINT PATH INF STORAGE 54

| DISJOINT PATH ID | NODE ARRANGEMENT | TOTAL COST |
|---|---|---|
| PATH 1 | N1 (30) → N2 (31) → N4 (33) → N5 (35) | 5 |
| PATH 2 | N1 (30) → N6 (34) → N3 (36) → N5 (35) | 5 |

TOPOLOGY INF STORAGE 50 (ORIGINAL TOPOLOGY INFORMATION)

| LINK ID | NODE 1 | NODE 2 | LINK-COST | DIRECTION |
|---|---|---|---|---|
| L1 | N1 (30) | N2 (31) | 1 | 0 |
| L2 | N1 (30) | N6 (34) | 2 | 0 |
| L3 | N2 (31) | N3 (36) | 1 | 0 |
| L4 | N2 (31) | N4 (33) | 2 | 0 |
| L5 | N3 (36) | N5 (35) | 1 | 0 |
| L6 | N3 (36) | N6 (34) | 2 | 0 |
| L7 | N4 (33) | N5 (35) | 2 | 0 |
| ... | ... | ... | ... | ... |

TOPOLOGY INF STORAGE 50 (TEMPORARILY CHANGED TOPOLOGY INFORMATION)

| LINK ID | NODE 1 | NODE 2 | LINK-COST | DIRECTION |
|---|---|---|---|---|
| L1 | N1 (30) | N2 (31) | -1 | 2 |
| L2 | N1 (30) | N6 (34) | 2 | 0 |
| L3 | N2 (31) | N3 (36) | -1 | 2 |
| L4 | N2 (31) | N4 (33) | 2 | 0 |
| L5 | N3 (36) | N5 (35) | -1 | 2 |
| L6 | N3 (36) | N6 (34) | 2 | 0 |
| L7 | N4 (33) | N5 (35) | 2 | 0 |
| ... | ... | ... | ... | ... |

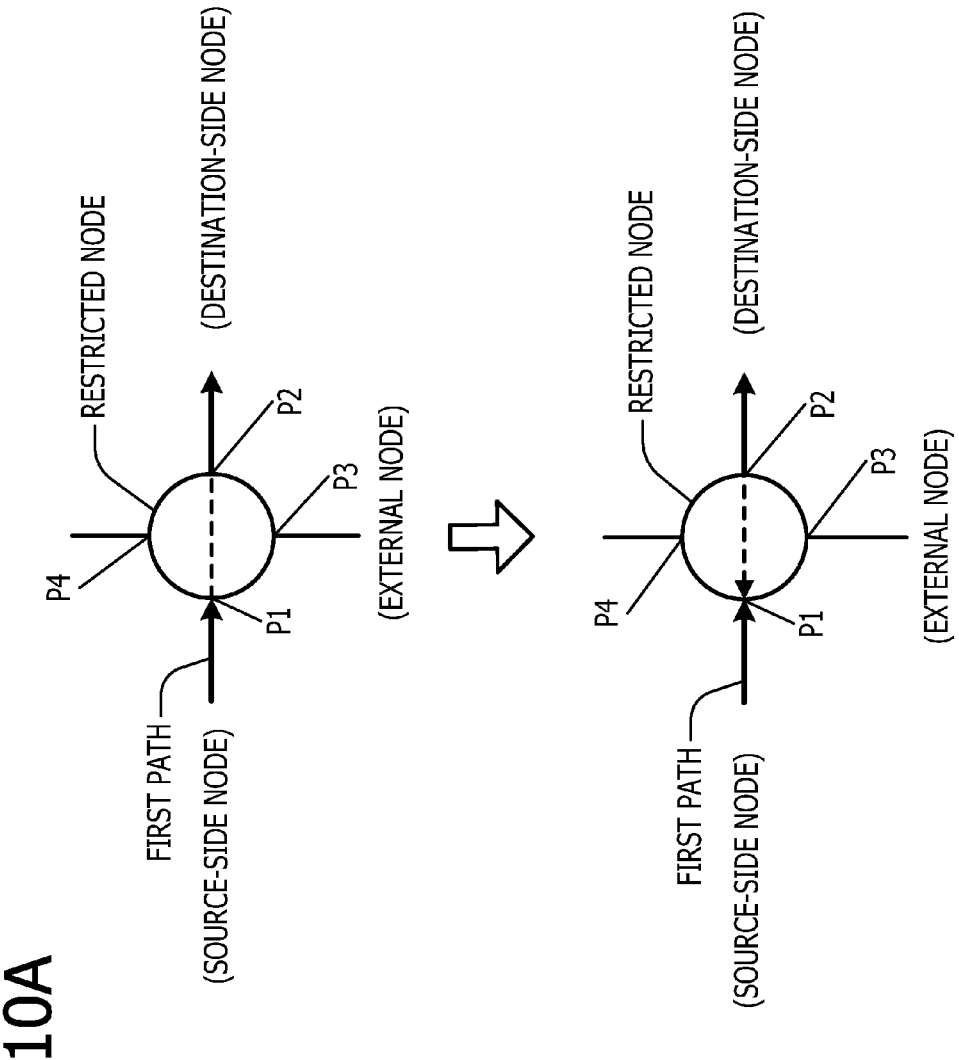

FIG. 11

PORT INF STORAGE 52

| RESTRICTED NODE ID (521) | PORT CONNECTION (522) | NODE 1 (523) | NODE 2 (524) | CONNECTION CONDITION (525) |
|---|---|---|---|---|
| N3 (36) | P1 – P2 | N2 (31) | N5 (35) | 2 |
| | P1 – P3 | N2 (31) | N6 (34) | 3 |
| | P2 – P3 | N5 (35) | N6 (34) | 1 |
| --- | --- | --- | --- | --- |

TOPOLOGY INF STORAGE 50

| LINK ID | NODE 1 | NODE 2 | LINK-COST | DIRECTION |
|---|---|---|---|---|
| L1 | N1 (70) | N2 (71) | 1 | 0 |
| L2 | N1 (70) | N6 (74) | 2 | 0 |
| L3 | N2 (71) | N3 (76) | 1 | 0 |
| L4 | N2 (71) | N4 (73) | 2 | 0 |
| L5 | N3 (76) | N5 (75) | 1 | 0 |
| L6 | N3 (76) | N6 (74) | 2 | 0 |
| L7 | N4 (73) | N5 (75) | 2 | 0 |
| ... | ... | ... | ... | ... |

TOPOLOGY INF STORAGE 50

| LINK ID | NODE 1 | NODE 2 | LINK-COST | DIRECTION |
|---|---|---|---|---|
| L1 | N1 (70) | N2a (71a) | -1 | 2 |
| L2 | N1 (70) | N6 (74) | 2 | 0 |
| L8 | N2a (71a) | N2b (71b) | 0 | 2 |
| L4a | N2a (71a) | N4 (73) | 2 | 2 |
| L3 | N2b (71b) | N3a (76a) | -1 | 2 |
| L4b | N2b (71b) | N4 (73) | 2 | 1 |
| L9 | N3a (76a) | N3b (76b) | 0 | 2 |
| L6a | N3a (76a) | N6 (74) | 2 | 2 |
| L5 | N3b (76b) | N5 (75) | -1 | 2 |
| L6b | N3b (76b) | N6 (74) | 2 | 1 |
| L7 | N4 (73) | N5 (75) | 2 | 0 |
| ... | ... | ... | ... | ... |

APPARATUS AND METHOD FOR FINDING A PAIR OF DISJOINT PATHS IN A COMMUNICATION NETWORK

CROSS-REFERENCE TO RELATED APPLICATION

This application is based upon and claims the benefit of priority of the prior Japanese Patent Application No. 2009-186783, filed on Aug. 11, 2009, the entire contents of which are incorporated herein by reference.

FIELD

The present invention relates to an apparatus and method for finding a pair of disjoint paths in a communication network.

BACKGROUND

In order to improve the reliability of a communication network, various techniques have been studied which allow searching for disjoint paths that bypass a communication route in which a failure, such as a node failure or a link failure, has occurred.

For example, a method of searching a plurality of paths passing from a source node to a destination node in a network, for a pair of link-disjoint paths or for a pair of node-disjoint paths, was proposed in R. Bhandari, "Optical physical diversity algorithms and survivable networks", Proceedings of the 2nd IEEE Symposium on Computer and Communication (ISCC '97), pp. 433-441, 1997).

FIG. 18 is a diagram illustrating an example of a path search method in which a pair of link-disjoint paths passing from source node 20 to destination node 25 is reconfigured in an optical network.

A path search apparatus searches a plurality of paths passing from the source node 20 to the destination node 25, for a first path having the minimum total link-cost among the plurality of paths (refer to [1] in FIG. 18), based on topology information (not depicted in FIG. 18) of a network, for example, the optical network. Here, in the initial state, all the links in the network are defined as bidirectional links in the topology information, and a link cost of a link is expressed as a signed integer beside the link, if needed, as depicted in FIG. 18. In the example of FIG. 18, the path search apparatus finds, as the first path, a path SP1 "source node 20-->node 21-->node 22-->destination node 25" that has the minimum total link-cost "3" among all the paths passing from source node 20 to destination node 25.

Next, the path search apparatus changes the topology information of the network so that the direction of each link connecting adjacent two nodes along the first path SP1 is reversed, and the sign of each link cost along the first path SP1 is reversed. Then, the path search apparatus searches, based on the changed topology information, the plurality of paths for a second path having the minimum total link-cost among the plurality of paths (refer to [2] in FIG. 18). In the example of FIG. 18, the search apparatus finds, as the second path, a path SP2 "source node 20-->node 24-->node 22-->node 21-->node 23-->destination node 25" that has the minimum total link-cost "7" among all the paths passing from source node 20 to destination node 25. In this way, it is possible to change the topology information so that the first path is not searched for as a path having the minimum total link-cost among the plurality of paths.

Last, the path search apparatus reconfigures a pair of link-disjoint paths passing from source node 20 to destination node 25 by removing links shared by both the two paths SP1 and SP2 (refer to [3] and [4] in FIG. 18). In the example of FIG. 18, the path search apparatus reconfigures a pair of link-disjoint paths: Path 1 "source node 20-->node 21-->node 23-->destination node 25" and Path 2 "source node 20-->node 24-->node 22-->destination node 25", by removing the link connecting nodes 21 and 22 and using the remaining parts of the first and second paths.

SUMMARY

According to an aspect of an embodiment, there is provided apparatus and method for finding a pair of disjoint paths in a network. Topology information includes, for each link connecting a pair of nodes in the network, a link identifier identifying the pair of nodes, a link-cost assigned to the each link, and direction of data transmission. Port information includes, for each restricted node, one or more restriction conditions on connectivity among ports within the each restricted node, where the each restricted node is a node in which the one or more restriction conditions are imposed on connectivity among ports therein. A path search apparatus finds a first path having the minimum total link-cost by searching, based on the topology information, a plurality of paths passing from a source node to a destination node in the network. Then the topology information is changed so that the first path is not searched for as a path having the minimum total link-cost among the plurality of paths, and the port information is changed based on a port connectivity change rule. Next, the path search apparatus finds a second path having the minimum total link-cost by searching the plurality of paths, based on the changed port information and the changed topology information. Last, the path search apparatus reconfigures a pair of link-disjoint paths that do not share a link with each other and satisfy the one or more restriction conditions imposed on connectivity among ports within the restricted node, by removing a link shared by both the first and second paths from the original topology information.

The object and advantages of the invention will be realized and attained by means of the elements and combinations particularly pointed out in the claims.

It is to be understood that both the foregoing general description and following detailed description are exemplary and explanatory and are not restrictive of the invention, as claimed.

BRIEF DESCRIPTION OF DRAWINGS

FIGS. 2A, 2B, 2C are diagrams illustrating examples of a path search method performed by a path search apparatus, according to an embodiment;

FIG. 4 is a diagram illustrating an example of a topology information storage, according to an embodiment;

FIG. 5 is a diagram illustrating an example of a first path information storage 51, according to an embodiment;

FIG. 6 is a diagram illustrating an example of port information storage 52, according to an embodiment;

FIG. 7 is a diagram illustrating an example of second path information storage, according to an embodiment;

FIG. 8 is a diagram illustrating an example of a disjoint path information storage, according to an embodiment;

FIGS. 10A, 10B, 10C are schematic diagrams illustrating an example of a port connectivity change rule used by a port change unit, according to an embodiment;

FIG. 11 is a schematic diagram illustrating an example of port information changed by a port change unit, according to an embodiment;

DESCRIPTION OF EMBODIMENTS

In some cases, an optical network may include a node (hereafter called "a restricted node") in which connectivity among ports within the node is restricted for a physical reason, for example, for the reason that an adjustable angle of the mirror within an optical switch for switching ports is limited. Further, in another case, such a restricted node may be installed in an optical network based on the operation policy that is determined beforehand by the administrator of the optical network.

Figure 18:
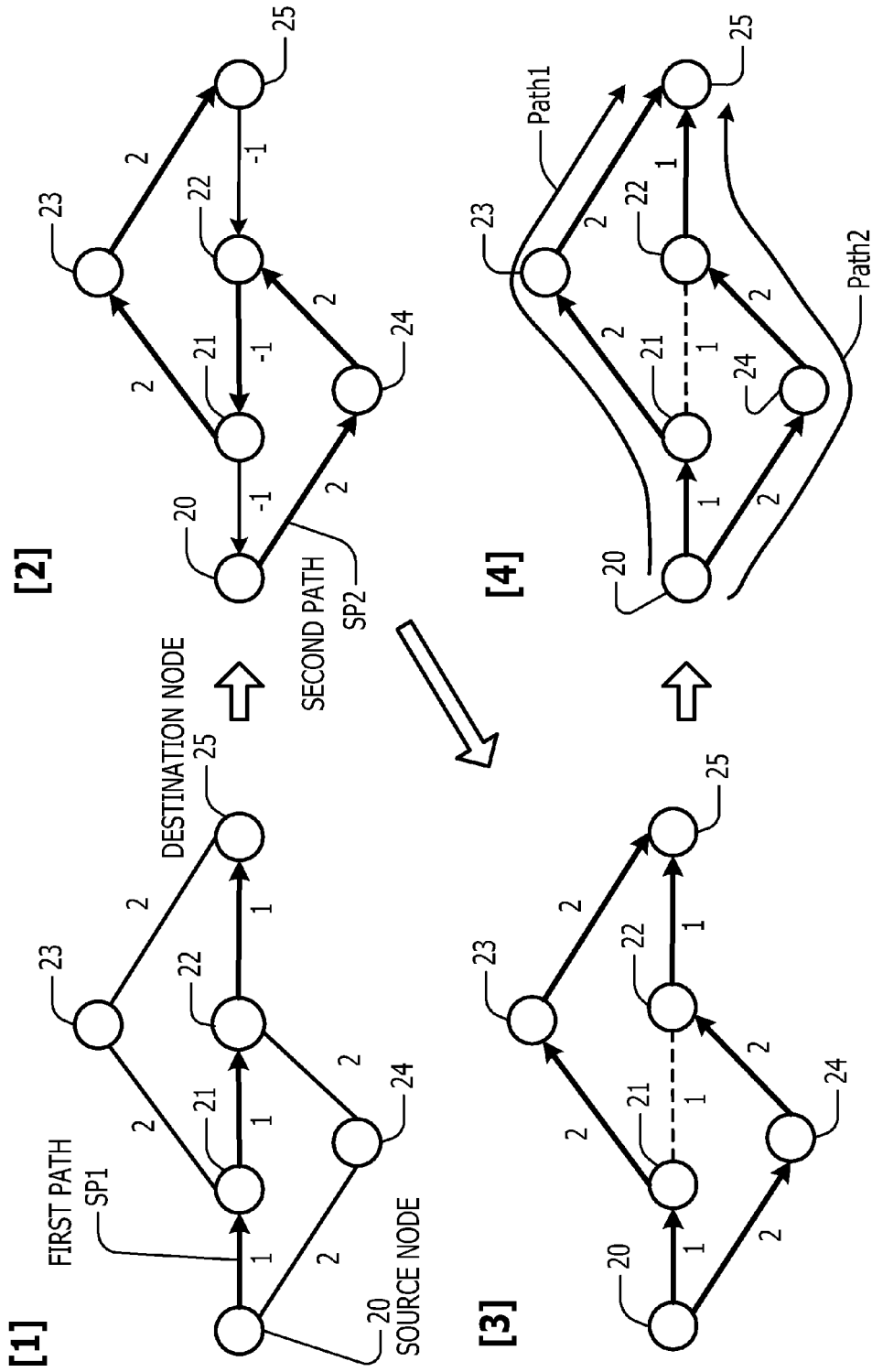
FIG. 18 is a diagram illustrating an example of a path search method.
Figure 19:
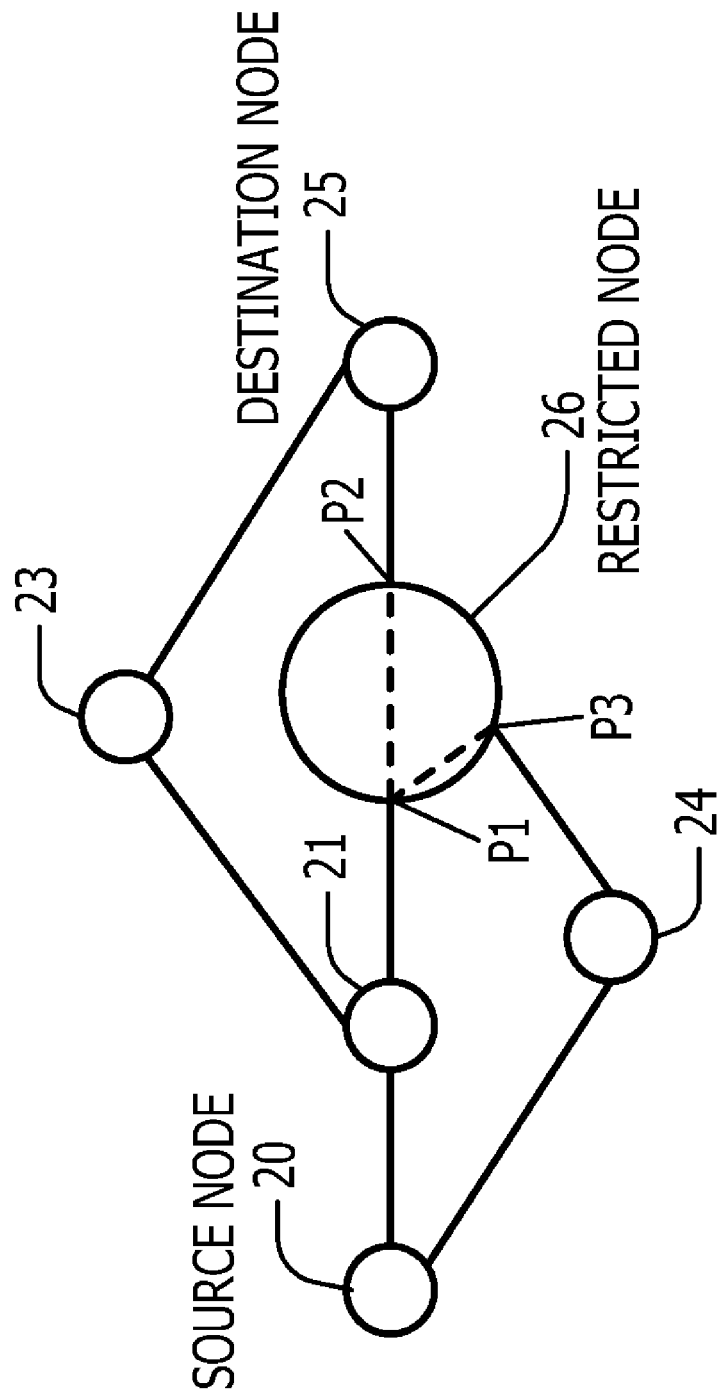
FIG. 19 is a schematic diagram illustrating an example of an optical network including a restricted node.

FIG. 19 is a schematic diagram illustrating an example of an optical network including a restricted node. In the example of FIG. 19, the optical network includes a restricted node 26 in place of the node 22 in the optical network depicted in FIG. 18. The restricted node 26 is, for example, a relay node having the three communication ports: P1 to P3. In the restricted node 26, restriction conditions are imposed on connectivity among ports P1 to P3, for example, such that data transmission between node 21 and node 24 via restricted node 26 and data transmission between node 21 and node 25 via restricted node 26 are allowed (as depicted with a dotted line between P1 and P3 and a dotted line between P1 and P2, in FIG. 19), but data transmission between node 24 and node 25 via restricted node 26 is inhibited (as depicted with lack of a dotted line between P2 and P3, in FIG. 19).

Thus, in the case of an optical network including a restricted node, there exists a problem that a path including a connection between ports via which data transmission is inhibited, may be reconfigured as a pair of disjoint paths, for example, a pair of link-disjoint paths, that pass from a source node to a destination node.

Figure 20:
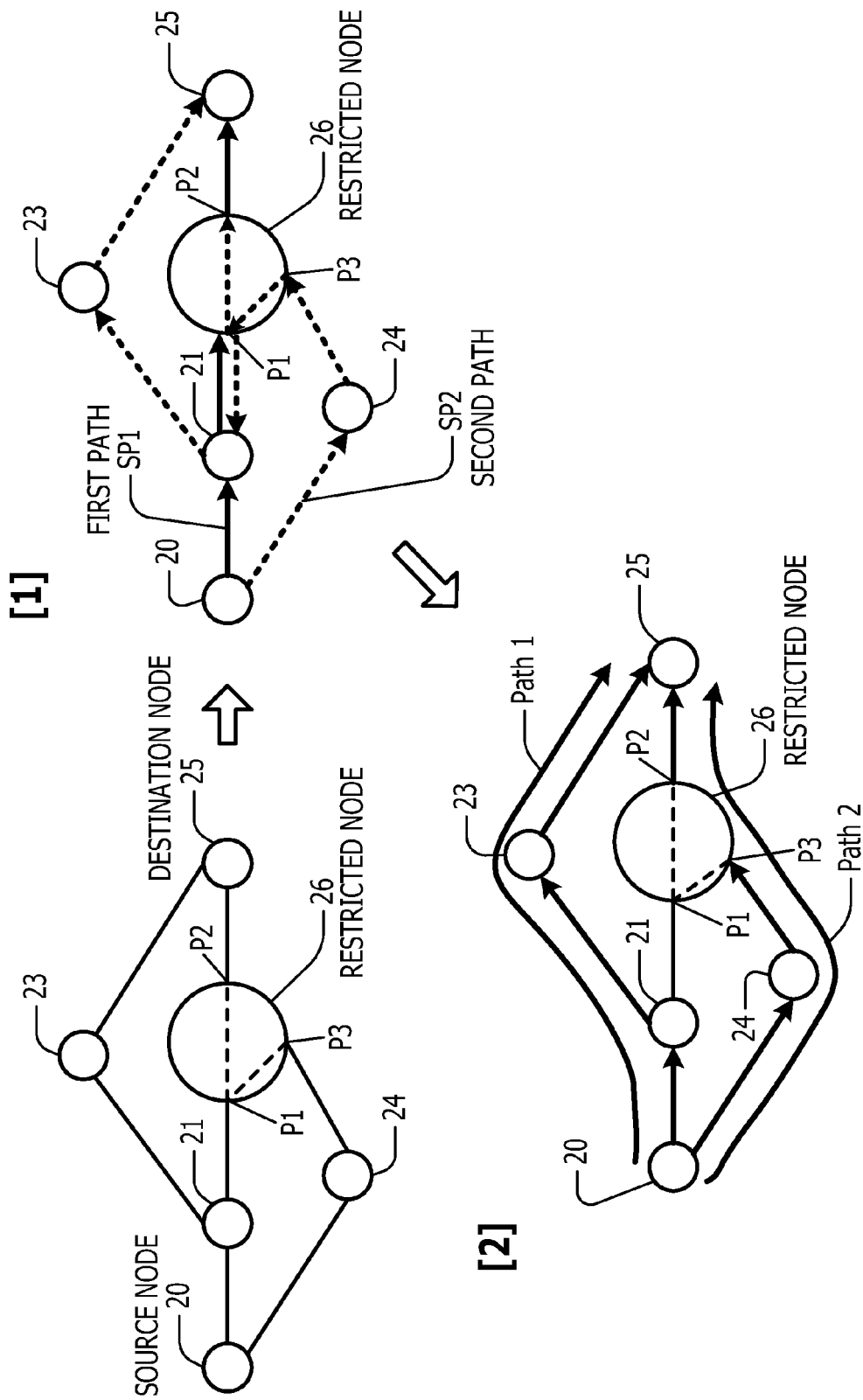
FIG. 20 is a schematic diagram illustrating a problem arising when a known path search method is applied to the optical network depicted in FIG. 19.

FIG. 20 is a schematic diagram illustrating a problem arising when a known path search method is applied to the optical network depicted in FIG. 19.

According to a known path search method, a path search apparatus searches a plurality of paths passing from source node 20 to destination node 25, for two shortest paths: SP1 (depicted with a directional line in [1] of FIG. 20) and SP2 (depicted with a dotted directional line in [1] of FIG. 20). Here, both the paths SP1 and SP2 are satisfying the restriction conditions imposed on the restricted node 26.

Then, the path search apparatus reconfigures a pair of disjoint paths (Path1 and Path2) passing from source node 20 to destination node 25, as depicted in [2] of FIG. 20, by removing a link (between node 21 and restricted node 26) that is shared by both the two shortest paths: SP1 and SP2.

However, out of the two obtained paths Path1 and Path2, the Path2 is not appropriate for a disjoint path because the Path2 includes a route "node 24-->restricted node 26-->destination node 25" through which data transmission is inhibited due to the restriction conditions imposed on connectivity between ports P2 and P3 within restricted node 26.

Although the example of FIG. 20 illustrates a problem arising when a known path search method is applied to the optical network including a restricted node, the similar problem may arise when a known path search method is applied to various networks other than the optical network.

First, description will be given of a configuration of a path search apparatus according to a first embodiment with reference to the drawings. A path search apparatus according to the first embodiment searches a plurality of paths passing from a source node to a destination node, for a first path and a second path different from the first path. The path search apparatus according to the first embodiment reconfigures a pair of disjoint paths that do not share a link or a node with each other, by using the first and second paths.

Here, a node means a relay node constituting a network, and, for example, may be an Optical add-drop multiplexer (OADM) or a Wavelength Cross Connect (WXC) in an optical network. Further, a network may be a Wavelength Division Multiplexing (WDM) network that is operated by using a WDM method.

Figure 1:
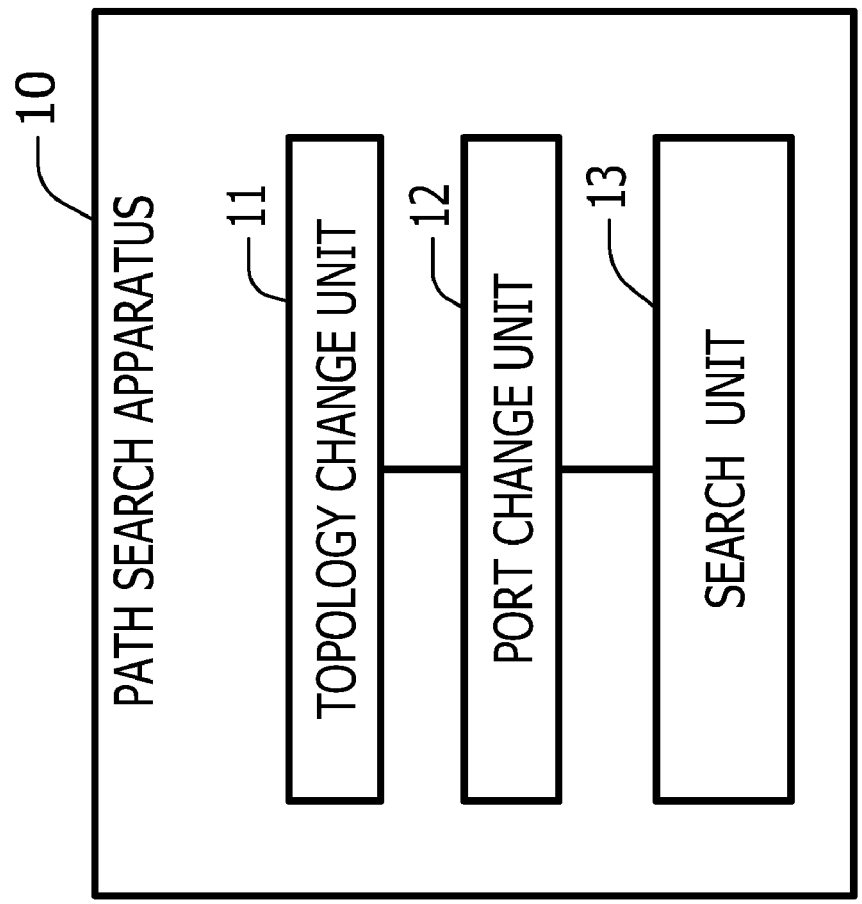
FIG. 1 is a diagram illustrating an example of a configuration of a path search apparatus, according to an embodiment.

FIG. 1 is a diagram illustrating an example of a configuration of a path search apparatus according to a first embodiment. As depicted in FIG. 1, a path search apparatus 10 according to the first embodiment includes topology change unit 11, port change unit 12, and search unit 13.

The path search apparatus 10 finds a first path having the minimum total link-cost by searching, based on topology information that includes connection states among nodes in the network, a plurality of paths passing from a source node to a destination node in the network. Then, the topology change unit 11 changes the topology information so that the found first path is not searched for as a path having the minimum total link-cost among the plurality of paths when searching for a second path (will be described later).

Further, when the first path includes a restricted node in which restriction conditions are imposed on connectivity among ports within the restricted node, the port change unit 12 changes port information, which includes restriction conditions imposed on connectivity among ports within the restricted node, so that a path not satisfying the imposed restriction conditions is not reconfigured as one of a pair of disjoint paths. The search unit 13 search for a second path based on the changed topology information and the changed port information.

As mentioned above, the path search apparatus 10 searches for the second path based on the changed topology information and the changed port information, where the original topology information is changed so that the first path is not searched for as a path having the minimum total link-cost among the plurality of paths, and the port information is changed so that a path not satisfying the imposed restriction conditions is not reconfigured as one of a pair of disjoint paths. Here, the details of a method for changing port information will be described later. In this way, the path search apparatus 10 may reconfigure the pair of disjoint paths satisfying the imposed restriction conditions by using the first and second paths. For example, reconfiguration of a pair of disjoint paths may be performed by removing a common link shared by both the first and second paths from the original topology information and using the remaining parts of the first and second paths. Thus, even in the case of a network including a restricted node in which restriction conditions are imposed on connectivity among ports within the restricted node, it is possible for the path search apparatus 10 to appropriately reconfigure a pair of disjoint paths satisfying the restriction conditions.

Next, description will be given of a configuration of a path search apparatus according to a second embodiment.

FIGS. 2A, 2B, 2C are diagrams illustrating examples of a path search method performed by a path search apparatus, according to a second embodiment, in which a process for reconfiguring a pair of disjoint paths is schematically depicted, in association with link-costs and directions stored in the topology information and restriction conditions imposed on connectivity among ports within a restricted node. FIG. 2A illustrates an example in which a pair of link-disjoint paths passing from a source node to a destination node in a network are reconfigured by a path search apparatus according to a second embodiment. Out of FIGS. 2A, 2B, 2C, FIGS. 2B and 2C illustrate examples in which the path search apparatus failed to reconfigure a pair of link-disjoint paths.

First, with reference to FIG. 2A, description will be given of an example in which a pair of link-disjoint paths passing from a source node to a destination node in a network are reconfigured by a path search apparatus. In the case, it is assumed that the network depicted in FIG. 2A includes restricted node 36. Further, it is assumed that restriction conditions are imposed on connectivity among ports P1 to P3 within restricted node 36. That is, data transmission between destination node 35 and node 31 via restricted node 36 is allowed, data transmission between destination node 35 and node 34 via restricted node 36 is allowed, and data transmission between node 31 and node 34 via restricted node 36 is inhibited.

According to the embodiment, the path search apparatus finds a first path having the minimum total link-cost by searching a plurality of paths passing from a source node to a destination node in a network (refer to [1] of FIG. 2A), based on topology information of the network. Here, in the initial state, all the links in the network are defined as bidirectional links in the topology information, and a link cost of a link is expressed as a signed integer beside the link, if needed, as depicted in FIG. 2A. In the example of FIG. 2A, the path search apparatus finds, as a first path, path SP1 "source node 30-->node 31-->restricted node 36-->destination node 35" that has the minimum total link-cost "3" among the plurality of paths.

Then, the path search apparatus changes topology information so that the found first path SP1 is not searched for as a path having the minimum total link-cost among the plurality of paths. In the example of FIG. 2A, the path search apparatus reverses the signs of link-costs of the first path SP1 in the topology information and makes the directions of links included in the first path SP1 opposite to the directions of the first path SP1.

Further, the path search apparatus changes port information indicative of restriction conditions imposed on connectivity among ports P1 to P3 within restricted node 36, based on a port connectivity change rule, so that a path not satisfying the restriction conditions is not reconfigured as one of the pair of disjoint paths (refer to [2] of FIG. 2A).

In the following description, a source-side node means a node that is positioned closer to the source node along the first path than the restricted node, and a destination-side node means a node that is positioned closer to the destination node along the first path than the restricted node. Further, an external node means a node that is positioned outside the first path.

In the example of FIG. 2A, the port connectivity change rule requests that, when allowing connection between port P1 and P2 as depicted in [1] of FIG. 2A, where P1 and P2 are respectively connected to source-side node 31 and destination-side node 35, the path search apparatus changes the port information so that data transmission in the direction only from destination-side node 35 to source-side node 31 is allowed. Further, when allowing connection between port P2 and P3 as depicted in [1] of FIG. 2A, where P2 and P3 are respectively connected to destination-side node 35 and external node 34, the path search apparatus changes the port information so that data transmission in the direction only from external node 34 to source-side node 31 is allowed.

Next, the path search apparatus searches the plurality of paths, for a second path different from the first path SP1 (refer to [3] of FIG. 2A). In the example of FIG. 2A, the path search apparatus is capable of finding, as the second path, path SP2 "source node 30-->node 34-->restricted node 36-->node 31-->node 33-->destination node 35" that has the minimum total link-cost "7" among the plurality of paths.

Next, the path search apparatus reconfigures a pair of link-disjoint paths passing from source node 30 to destination node 35, by removing links shared by both the two paths SP1 and SP2 (refer to [4] of FIG. 2A). In the example of FIG. 2A, the path search apparatus reconfigures, as a pair of link-disjoint paths, a pair of paths: Path1 "source node 30-->node 31-->node 33-->destination node 35" and Path2 "source node 30-->node 34-->restricted node 36-->destination node 35" by removing the link between node 31 and restricted node 36 and using the remaining parts of the first and second paths.

Out of the pair of link-disjoint paths (Path1 and Path2) reconfigured as mentioned above, the disjoint path Path2 includes restricted node 36. However, the Path2 is a correct disjoint path because the Path2 satisfies the restriction conditions imposed on connectivity among ports P1 to P3 within restricted node 36.

Thus, in a path search method according to the second embodiment, topology information is changed so that the first path that has been already found is not searched for as a path having the minimum total link-cost among the plurality of paths, thereby preventing the first path being searched for as a second path. Further, port information is changed, based on the port connectivity change rule, so that a path not satisfying restriction conditions imposed on connectivity among ports within the restricted node is not reconfigured as one of the pair of link-disjoint paths. Then the path search apparatus according to the second embodiment finds a second path different from the first path, based on the changed topology information and the changed port information.

As a result, using the path search method according to the second embodiment allows the path search apparatus to prevent a path not satisfying restriction conditions imposed on connectivity among ports within the restricted node, from being reconfigured as one of the pair of link-disjoint paths. Thus, even in a network including a restricted node in which restriction conditions are imposed on connectivity among ports within the restricted node, the path search method according to the second embodiment allows the path search apparatus to appropriately reconfigure a pair of link-disjoint paths satisfying the restriction conditions imposed on the restricted node.

Next, description will be given of an example in which a path search apparatus fails to reconfigure a pair of link-disjoint paths passing from source node 30 to destination node 35 in a network. In FIG. 2B, restricted node 36 in the network depicted in FIG. 2A is replaced with restricted node 37. Further, restriction conditions are imposed on connectivity among P1 to P3 within restricted node 37, such that data transmission between node 31 and node 34 via restricted node 37 is allowed, data transmission between node 31 and destination node 35 via restricted node 37 is allowed, and data transmission between node 34 and destination node 35 via restricted node 37 is inhibited, as depicted in [1] of FIG. 2B.

According to the embodiment, a path search apparatus search a plurality of paths passing from a source node to a destination node, for a first path having the minimum total link-cost, based on topology information including connection states among nodes in a network (refer to [1] of FIG. 2B). Here, in the initial state, all the links in the network are defined as bidirectional links in the topology information, and a link cost of a link is expressed as a signed integer beside the link, if needed, as depicted in FIG. 2B.

Then, the path search apparatus changes the topology information so that the first path that has been already found is not searched for, as a path having the minimum total link-cost among the plurality of paths. Further, the path search apparatus changes port information, which stores restriction conditions imposed on connectivity among ports P1 to P3 within restricted node 37, based on a port connectivity change rule, so that a path not satisfying the restriction conditions is not reconfigured as one of the pair of link-disjoint paths, as depicted in [2] of FIG. 2B. Detail of the port connectivity change rule will be described later with reference to FIGS. 10A, 10B, 10C.

Next, the path search apparatus tries to search the plurality of paths for a second path different from the first path, based on the changed topology information and the changed port information, as depicted in [3] of FIG. 2B. However, in the example depicted in FIG. 2B, the path search apparatus fails to find the second path among the plurality of paths. As a result, the path search apparatus also fails to reconfigure a pair of link-disjoint paths.

Last, the path search apparatus displays the processing result meaning that the path search apparatus is unable to reconfigure a pair of link-disjoint paths as a result of failing to find a second path among the plurality of paths, as depicted in [4] of FIG. 2B.

As mentioned above, in a path search method according to the second embodiment, the path search apparatus search for a second path, based on topology information and port information, wherein the topology information is beforehand changed so that the first path is not searched for as a path having the minimum total link-cost among the plurality of paths, and the port information is also beforehand changed so that a path not satisfying restriction conditions imposed on connectivity among ports within restricted node is not reconfigured as one of a pair of link-disjoint paths. Thus, in a network including a restricted node in which restriction conditions are imposed on connectivity among ports within the restricted node, the path search method according to the second embodiment prevents the path search apparatus from erroneously reconfiguring a path not satisfying the restriction conditions as one of a pair of link-disjoint paths.

Next, description will be given of another example in which a path search apparatus fails to reconfigure a pair of link-disjoint paths passing from source node 30 to destination node 35. In FIG. 2C, node 31 and restricted node 36 depicted in FIG. 2A are replaced with two restricted nodes 38 and 39, respectively. Here, restriction conditions are imposed on connectivity among ports P1 to P3 within restricted node 38 such that data transmission between restricted node 39 and source node 30 via restricted node 38 is allowed, data transmission between restricted node 39 and node 33 via restricted node 38 is allowed, and data transmission between source node 30 and node 33 via restricted node 38 is inhibited. Further, restriction conditions are imposed on connectivity among ports P4 to P6 within restricted node 39 such that data transmission between destination node 35 and restricted node 38 via restricted node 39 is allowed, data transmission between destination node 35 and node 34 via restricted node 39 is allowed, and data transmission between restricted node 38 and node 34 via restricted node 39 is inhibited.

In the example of FIG. 2C, a path search apparatus searches a plurality of paths passing from source node 30 to destination node 35, for a first path SP1 having the minimum total link-cost, based on topology information storing connection states among nodes in a network, as depicted in [1] of FIG. 2C. Here, in the initial state, all the links in the network are defined as bidirectional links in the topology information, and a link cost of a link is expressed, if needed, as a signed integer beside the link as depicted in FIG. 2C.

Next, the path search apparatus changes the topology information so that the first path SP1 is not searched as a path having the minimum total link-cost among the plurality of paths. Then, the path search apparatus changes the port information so that a path not satisfying the original restriction conditions imposed on connectivity among ports P1 to P3 within restricted node 38 is not reconfigured as one of a pair of link-disjoint paths. Further, the path search apparatus changes the port information so that a path not satisfying the original restriction conditions imposed on connectivity among ports P4 to P6 within restricted node 39 is not reconfigured as one of the pair of link-disjoint paths, as depicted in [2] of FIG. 2C.

Next, the path search apparatus tries to search the plurality of paths for a second path different from the first path, based on the changed topology information and the changed port information, as depicted in [3] of FIG. 2C. However, in the example depicted in FIG. 2C, the path search apparatus apparently fails to find the second path among the plurality of paths, thereby also failing to reconfigure a pair of link-disjoint paths.

Last, the path search apparatus displays the processing result meaning that the path search apparatus is unable to reconfigure a pair of link-disjoint paths as a result of failing to find a second path among the plurality of paths, as depicted in [4] of FIG. 2C.

As mentioned above, in a path search method according to the second embodiment, the path search apparatus searches for a second path, based on topology information and port information, wherein the topology information is changed so that the first path is not searched for as a path having the minimum total link-cost among the plurality of paths, and the port information is changed, based on a port connectivity change rule, so that a path not satisfying restriction conditions imposed on connectivity among ports within restricted node is not reconfigured as one of a pair of link-disjoint paths. Thus, the path search method according to the second embodiment prevents the path search apparatus from erroneously reconfiguring a path not satisfying the restriction conditions as one of a pair of link-disjoint paths, even in a network including multiple restricted nodes in which restriction conditions are imposed on connectivity among ports within each of the restricted nodes.

Figure 3:
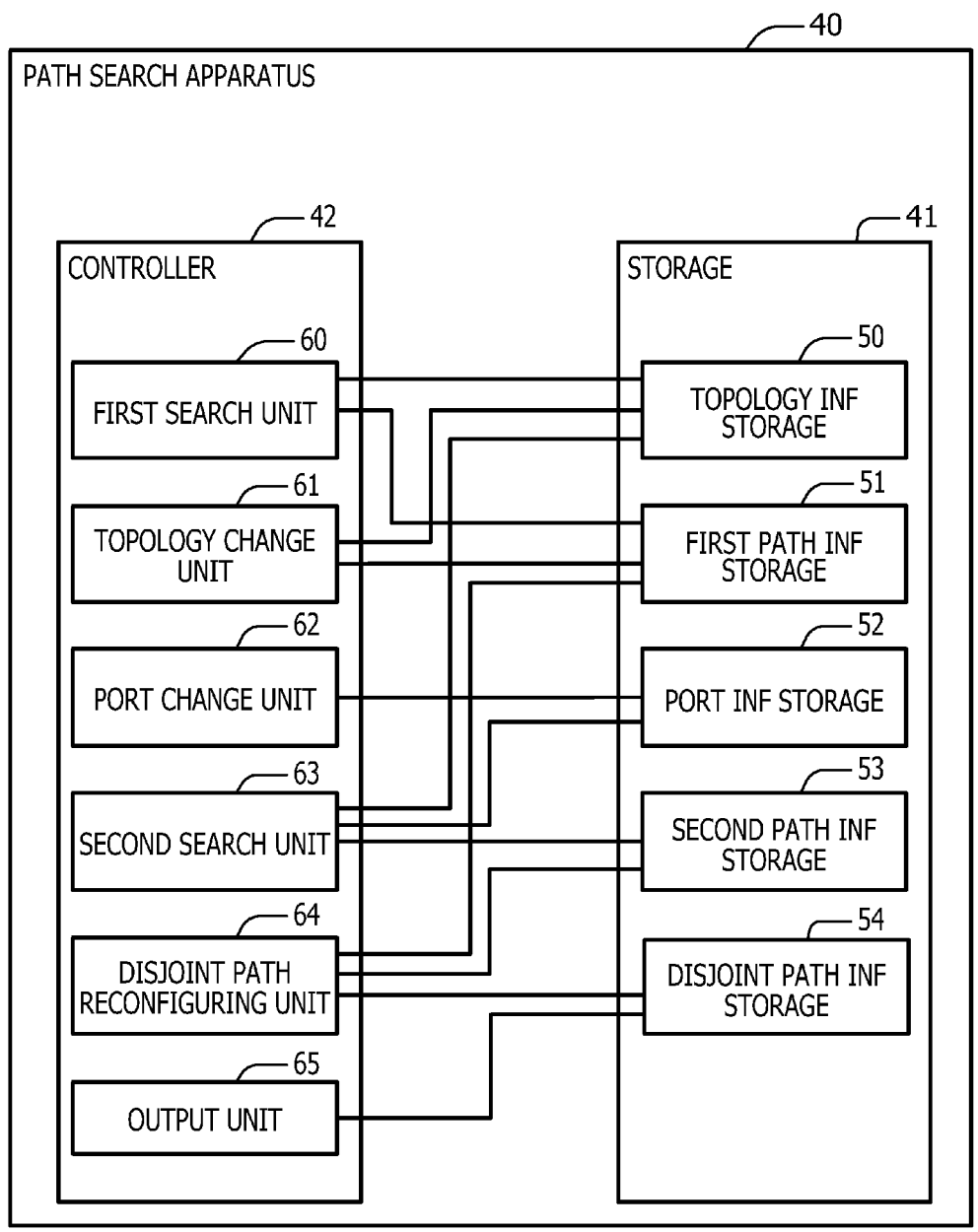
FIG. 3 is a diagram illustrating an example of a configuration of a path search apparatus, according to an embodiment.

Next, description will be given of an example of a configuration of a path search apparatus according to a second embodiment, with reference to FIG. 3. FIG. 3 is a diagram illustrating an example of a configuration of a path search apparatus, according to a second embodiment. As depicted in FIG. 3, path search apparatus 40 includes storage 41 and controller 42.

The storage 41 stores data necessary for various types of processing performed by the controller 42 and stores the results of the various types of processing performed by the controller 42. The storage 41 may be a semiconductor memory such as a RAM (Random Access Memory), a ROM (Read Only Memory), or a flash memory. Further, the storage 41 may be a storage device such as a HDD (Hard Disk Drive) or an optical disk. The storage 41 includes topology information storage 50, first path information storage 51, port information storage 52, second path information storage 53, and disjoint path information storage 54. Here, in FIG. 3, spelling of the word "information" is abbreviated as "inf".

The topology information storage 50 stores, as topology information, information on a connection state among nodes in the network in which a plurality of nodes are connected via one or more links.

FIG. 4 is a diagram illustrating an example of a topology information storage, according to an embodiment. Topology information storage 50 may be configured to store, as topology information, information input by a user or information collected from each node via communication I/F (not depicted in FIG. 3). As depicted in FIG. 4, topology information storage 50 stores, for example, the following data: link ID 501, node1 502, node2 503, link-cost 504, and direction 505, as data items related to each other.

Link ID 501 is an identifier identifying a link connecting a pair of nodes included in the network. Node1 502 is an identifier identifying one of the pair of nodes connected via the link. Node2 503 is an identifier identifying the other one of the pair of nodes connected via the link. Here, in the example of FIG. 4, symbols N1 to N6 are depicted as node identifiers with parenthetic reference numbers described in FIG. 2A. Cost 504 is a link-cost meaning a logical distance of the link. Direction 505 is an identifier identifying a direction in which data transmission is performed via the link. For example, direction 505 may be configured to be set at "0" when data transmission is allowed both from node1 to node2 and from node2 to node1, to be set at "1" when data transmission is allowed from node1 to node2, and to be set at "2" when data transmission is allowed from node2 to node1.

The first path information storage 51 stores, as first path information, information on the first path that was found by searching the plurality of paths passing from a source node to a destination node in a network. FIG. 5 is a diagram illustrating an example of first path information storage 51, according to an embodiment. The first path information stored in first path information storage 51 is created and stored by first search unit 60 that will be described later. As depicted in FIG. 5, first path information storage 51 stores first path ID 511, node arrangement 512, and total cost 513, as data items related to each other.

First path ID 511 is an identifier identifying a first path. Node arrangement 512 is an ordered list of node identifiers each identifying a node included in the first path. For example, node arrangement "N1 (30)-->N2 (31)-->N3 (36)-->N5 (35)" indicates the sequence of nodes constituting the first path SP1 that passes from source node N1 (30) to destination node N5 (35) via nodes N2 (31) and N3 (36). The total cost 513 indicates the total sum of link-costs along the first path.

Port information storage 52 stores, as port information, information on restriction conditions imposed on connectivity among ports within a restricted node. FIG. 6 is a diagram illustrating an example of port information storage 52, according to an embodiment. Port information storage 52 may be configured to store, as port information, information input by a user or information collected from each node via communication I/F (not depicted FIG. 3). As depicted in FIG. 6, port information storage 52 stores restricted node ID 521, port connection 522, node1 523, node2 524, and connection state 525, as data items related to each other.

Restricted node ID 521 is an identifier identifying a restricted node. Port connection 522 is an identifier identifying a port-to-port connection between a pair of ports within the restricted node. For example, "P1-P2" means a port-to-port connection between ports P1 and P2 within restricted node N3 (36). Node1 523 is an identifier identifying a node that is connected to one of the pair of ports identified by port connection 522. Node2 524 is an identifier identifying a node that is connected to the other one of the pair of ports identified by port connection 522. Connection condition 525 is an identifier identifying restriction condition on connectivity between the pair of ports identified by the port connection 522. For example, connection condition 525 may be set at "0" when data transmission is allowed in both the directions: from node1 to node2 and from node2 to node1. Further, connection condition 525 may be set at "1" when data transmission is allowed from node1 to node2, may be set at "2" when data transmission is allowed from node2 to node1, and may be set at "3" when data transmission between node1 and node2 is inhibited.

Second path information storage 53 stores, as second path information, information on a second path different from the first path, which is found by searching the plurality of paths passing from a source node to a destination node in the network. FIG. 7 is a diagram illustrating an example of second path information storage 53, according to an embodiment. The second path information that is stored in second path information storage 53 is created and stored by second search unit 63 that will be described later. As depicted in FIG. 7, second path information storage 53 stores second path ID 531, node arrangement 532, and total cost 533, as data items related to each other.

Second path ID 531 is an identifier identifying a second path. Node arrangement 532 is an ordered list of node identifiers each identifying a node included in the first path. For example, node arrangement "N1 (30)-->N6 (34)-->N3 (36)-->N2 (31)-->N4 (33)-->N5 (35)" indicates the sequence of nodes constituting second path SP2 that passes from source node N1 (30) to destination node N5 (35) via node N6 (34), N3 (36), N2 (31), and N4 (33). The total cost 533 indicates the total sum of link-costs along the second path.

Disjoint path information storage 54 stores, as disjoint path information, information on a pair of link-disjoint paths that share no links with each other and have been reconfigured by searching the plurality of paths passing from a source node to a destination node in the network. FIG. 8 is a diagram illustrating an example of disjoint path information storage 54, according to an embodiment. Disjoint path information may be created by disjoint path reconfiguring unit 64 that will be described later, and stored in disjoint path information storage 54. As depicted in FIG. 8, disjoint path information storage 54 stores disjoint path ID 541, node arrangement 542, and total cost 543, in association with each other.

Disjoint path ID 541 is an identifier identifying a disjoint path. Node arrangement 542 is an ordered list of node identifiers each identifying a node positioned along the disjoint path. For example, node arrangement "N1 (30)-->N2 (31)-->N4 (33)-->N5 (35)" indicates the sequence of nodes constituting disjoint path Path1 that passes from source node N1 (30) to destination node N5 (35) via node N2 (31) and N4 (33). The total cost 543 indicates the total sum of link-costs along the disjoint path.

Controller 42 includes an internal memory for storing programs defining various types of processing, and for storing data necessary for the various types of processing. The various types of processing are performed based on these programs and data. Controller 42 may be configured with, for example, integrated circuits such as an ASIC (Application Specific Integrated Circuit) and a FPGA (Field Programmable Gate Array) or electronic circuits such as a CPU (Central Processing Unit) and a MPU (Micro Processing Unit). Controller 42 may be configured to include first search unit 60, topology change unit 61, port change unit 62, second search unit 63, disjoint path reconfiguring unit 64, and output unit 65.

First search unit 60 searches a plurality of paths passing from a source node to a destination node in a network, for a first path having the minimum total link-cost among the plurality of paths. For example, first search unit 60 may be configured to search the plurality of paths for the first path having the minimum total link-cost, by applying a path search algorithm such as a Dijkstra method to the topology information that has been read out from topology information storage 50. Further, first search unit 60 stores information on the first path, as first path information, into first path information storage 51.

Topology change unit 61 temporarily changes topology information such that the found first path is not searched for as a path having the minimum total link-cost among the plurality of paths. For example, topology change unit 61 reads out from first path information storage 51a node arrangement (for example, "N1-->N2-->N3-->N5") of the first path (for example, identified by first path ID "SP1") that has been found.

Figure 9:
FIG. 9 is a diagram illustrating an example of topology information processed by a topology change unit, according to an embodiment.

Then, topology change unit 61 reverses the signs of link-costs along the first path so that the directions of links connecting nodes that has been read out (for example, links identified by link IDs "L1", "L3", and "L5" depicted in FIG. 4) are opposite to those of the first path in the original topology information, as depicted in FIG. 9. In this way, the first path that has been already found is not searched for as a path having the minimum total link-cost among the plurality of paths, based on the temporarily changed topology information. Here, FIG. 9 is a diagram illustrating an example of transformation of topology information that is temporarily changed by topology change unit 61.

When the first path includes a restricted node, port change unit 62 temporarily changes port information indicative of restriction conditions imposed on connectivity among ports within the restricted node, so that a path not satisfying the imposed restriction conditions is not reconfigured as one of a pair of link-disjoint paths. For example, port change unit 62 reads out from first path information storage 51, the node arrangement (for example, "N1-->N2-->N3-->N5") of the first path (for example, SP1).

Then, port change unit 62 determines whether the node arrangement that has been read out (for example, node arrangement "N1-->N2-->N3-->N5") includes a restricted node (for example, N3) or not, by referring to port information storage 52. When it is determined that the node arrangement includes a restricted node, port change unit 62 temporarily changes the port information stored in port information storage 52.

Figure 10B:
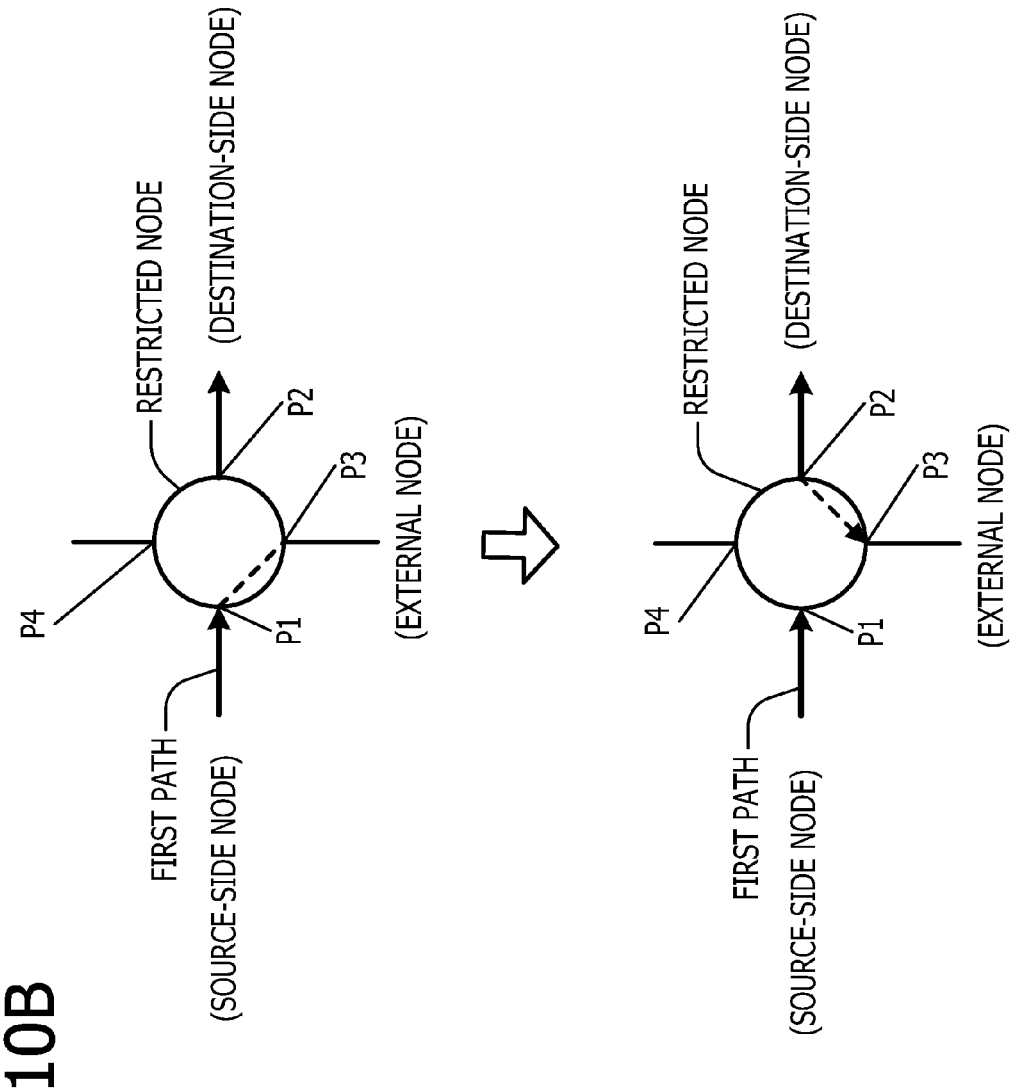
Figure 10C:
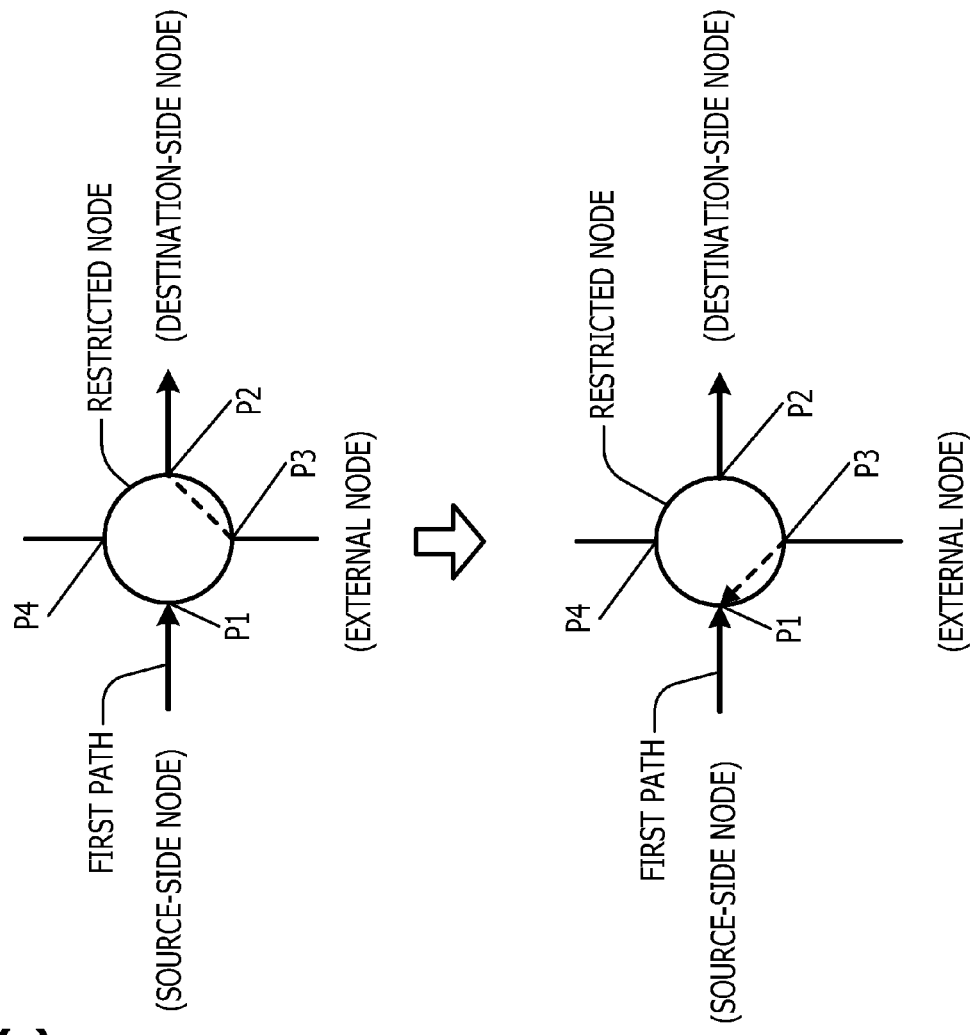

Next, description will be given of an example of a method in which port change unit 62 temporarily changes port information. FIGS. 10A, 10B, 10C are schematic diagrams illustrating an example of a port connectivity change rule used by port change unit 62, according to an embodiment. FIG. 11 is a schematic diagram illustrating an example of port information changed by a port change unit, according to an embodiment.

In the example of the port connectivity change rule depicted in FIG. 10A, when allowing connection between a first pair of ports (P1 and P2) that are within a restricted node and positioned along the first path, the port change unit 62 changes the corresponding connection condition 525 in the port information so as to temporarily allow data transmission from a destination-side node to a source-side node via the first pair of ports (direction: P2-->P1), where destination-side node is a node along the first path and adjacent to the restricted node toward the destination node of the first path, and the source-side node is a node along the first path and adjacent to the restricted node toward the source node of the first path.

In the example of the port connectivity change rule depicted in FIG. 10B, when allowing connection between a second pair of ports (P1 and P3) that are within the restricted node and positioned along a route connecting the source-side node and an external node of the first path via the restricted node, port changing unit 62 temporarily changes the corresponding connection condition in the port information so as to allow data transmission from the destination-side node to the external node via a third pair of ports (P2 and P3, and direction: P2-->P3), where the external node is a node adjacent to the restricted node and positioned outside the first path, and the third pair of ports is a pair of ports that are within the restricted node and positioned along a route connecting the destination-side node and the external node of the first path via the restriction node.

In the example of the port connectivity change rule depicted in FIG. 10C, when allowing connection between the third pair of ports (P2 and P3) that are within the restricted node and positioned along a route connecting the destination-side node and an external node of the first path via the restricted node, the port change unit 62 temporarily changes the corresponding connection condition in the port information so as to allow data transmission from the external node to the source-side node via the second pair of ports (direction: P3-->P1).

For example, port change unit 62 temporarily changes connection condition 525 stored in port information storage 52, from the values depicted in FIG. 6 to the values depicted in FIG. 11. That is, port change unit 62 sets value "2" to connection condition 525 of a record corresponding to port connection "P1-P2" meaning connection between source-side node "N2" (Node1 523) and destination-side node "N5" (Node2 524), where value "2" means allowing data transmission from destination-side node "N5" to source-side node "N2". Further, port change unit 62 sets value "1" to connection condition 525 of a record corresponding to port connection "P2-P3" meaning connection between destination-side node "N5" (NODE1 523) and external node "N6" (NODE2 524), where value "1" means allowing data transmission from destination-side node "N5" to external node "N6". Further, port change unit 62 sets value "3" to connection condition 525 of a record corresponding to the remaining port connection "P1-P3", where value "3" means that data transmission between source-side node "N2" and external node "N6" is inhibited. As mentioned above, port change unit 62 temporarily changes the port information based on the port connectivity change rule, as depicted in FIGS. 10A to 10C.

Here, returning to FIG. 3, second search unit 63 searches the plurality of paths passing from a source node to a destination node in the network, for a second path different from the first path, based on the topology information temporarily changed by topology change unit 61 and the port information temporarily changed by the port change unit 62. For example, second search unit 63 reads out, from topology information storage 50, the topology information temporarily changed by topology change unit 61, and read out, from port information storage 52, the port information temporarily changed by port change unit 62.

In the case, second search unit 63 finds a second path having minimum total link-cost from the plurality of paths, by applying a path search algorithm, such as a Dijkstra method, to the temporarily changed topology information and the temporarily changed port information. Further, second search unit 63 stores, as second path information, information on the found second path, into second path information storage 53.

When second search unit 63 has failed to find a second path among the plurality of paths, second search unit 63 informs disjoint path reconfiguring unit 64 about that effect.

Disjoint path reconfiguring unit 64 reconfigures a pair of link-disjoint paths passing from the source node to the destination node, by using the first and second paths that have been found. For example, disjoint path reconfiguring unit 64 read out the node arrangements of the first and second paths from first path information storage 51 and second path information storage, respectively.

In the case of the examples depicted in FIGS. 5 and 7, disjoint path reconfiguring unit 64 reads out the node arrangement "N1-->N2-->N3-->N5" corresponding to first path SP1 from first path information storage 51. Further, disjoint path reconfiguring unit 64 reads out the node arrangement "N1-->N6-->N3-->N2-->N4-->N5" corresponding to second path SP2 from second path information storage 53.

Then, disjoint path reconfiguring unit 64 determines a common link that is shared by both the first and second paths (for example, the link between nodes N2 and N3), by comparing the node arrangement of the first path with that of the second path.

In the examples depicted in FIGS. 5 and 7, disjoint path reconfiguring unit 64 determines, as a common link, the link between nodes N2 and N3, by comparing the node arrangement "N1-->N2-->N3-->N5" of the first path SP1 with the node arrangement "N1-->N6-->N3-->N2-->N4-->N5" of the second path SP2.

Then, disjoint path reconfiguring unit 64 reconfigures a pair of link-disjoint paths (for example, paths identified by disjoint path IDs: "Path1" and "Path2") by removing the determined common link from the node arrangements of the first and second paths and connecting the remaining parts of the first and second paths.

In the example depicted in FIG. 8, disjoint path reconfiguring unit 64 reconfigures a pair of link-disjoint paths (Path1 and Path2), by removing the determined common link between nodes N2 and N3 from the node arrangements of the first and second paths and connecting the remaining parts of the first and second paths.

Further, disjoint path reconfiguring unit 64 stores disjoint path information regarding the pair of link-disjoint paths that has been reconfigured, into disjoint path information storage 54. Here, upon receiving from the second search unit 63 the notification that second search unit 63 has failed to find a second path among the plurality of paths, disjoint path reconfiguring unit 64 sends, to output unit 65, the processing result that second search unit 63 has failed to find a second path among the plurality paths.

Output unit 65 displays, as the processing result, disjoint path information stored in disjoint path information storage 54 and information, which is received from disjoint path reconfiguring unit 64, indicating that a pair of link-disjoint paths has not been reconfigured.

Figure 12:
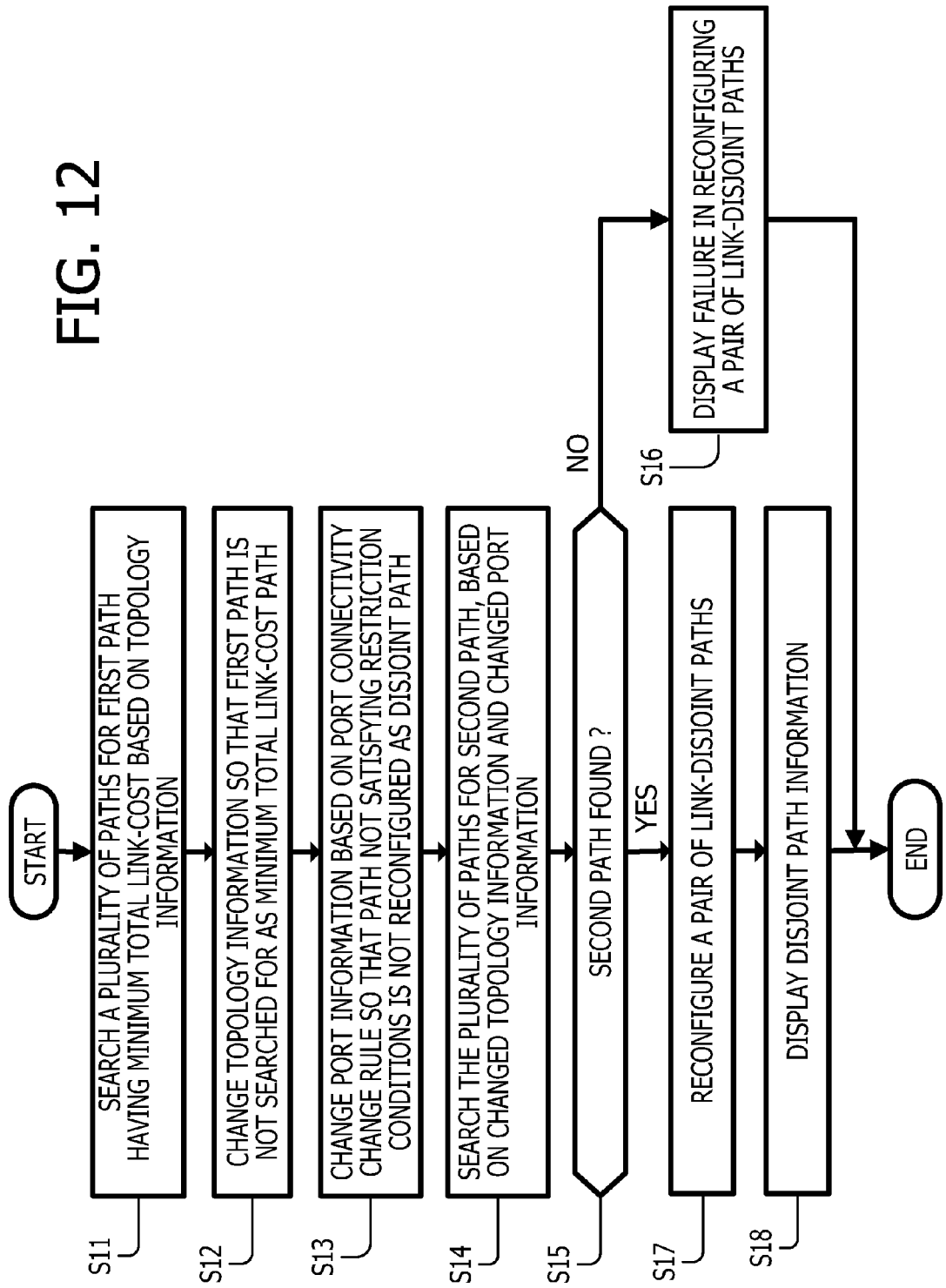
FIG. 12 is a diagram illustrating an example of an operational flowchart for finding a pair of link-disjoint paths by a path search apparatus, according to an embodiment.

FIG. 12 is a diagram illustrating an example of an operational flowchart for finding a pair of link-disjoint paths by path search apparatus 40, according to a second embodiment.

As depicted in FIG. 12, first search unit 60 searches the plurality of paths for a first path having the minimum total link-cost, based on topology information (in operation S11).

Next, topology change unit 61 temporarily changes the topology information so that the first path that has been found in operation S11 is not searched for as a path having the minimum total link-cost among the plurality of paths (in operation S12). Then, port change unit 62 temporarily changes the port information based on a port connectivity change rule so that a path not satisfying restriction condition on connectivity among ports within a restricted node is not reconfigured as one of a pair of link-disjoint paths (in operation S13).

Next, second search unit 63 searches the plurality of paths for a second path different from the first path, based on the changed topology and the changed port information (in operation S14). When the second path has not been found (NO in operation S15), second search unit 63 notifies disjoint path reconfiguring unit 64 about that effect.

Upon receiving the notification from second search unit 63, disjoint path reconfiguring unit 64 displays the processing result of failure in reconfiguring a pair of link-disjoint paths via output unit 65 (in operation S16).

Meanwhile, when second search unit 63 has succeeded in finding the second path (YES in operation S15), disjoint path reconfiguring unit 64 reconfigures a pair of link-disjoint paths, by removing a common link shared by both the first and second paths (in operation S17). Thereafter, disjoint path reconfiguring unit 64 stores, as disjoint path information, information on the pair of link-disjoint paths into disjoint path information storage 54. And then, disjoint path reconfiguring unit 64 displays the disjoint path information stored in disjoint path information storage 54 via output unit 65 (in operation S18).

In the operational flowchart depicted in FIG. 12, operation S12 and operation S13 may be exchanged.

As mentioned above, path search apparatus 40 according to a second embodiment temporarily changes topology information so that the first path that has been already found is not searched for as a path having the minimum total link-cost among the plurality of paths. Further, path search apparatus 40 according to the second embodiment temporarily changes port information, based on a port connectivity change rule, so that a path not satisfying restriction conditions imposed on connectivity among ports within a restricted node is not reconfigured as one of a pair of link-disjoint paths. Then, path search apparatus 40 according to the second embodiment, searches for a second path different from the first path, based on the changed topology and the changed port information.

As a result, path search apparatus 40 according to the second embodiment is capable of reconfiguring a pair of link-disjoint paths that share no links with each other and satisfy restriction conditions imposed on connectivity among ports within the restricted node, by removing a common link shared by both the first and second paths and connecting the remaining links of the first and second paths. That is, even in the case of a network including a restricted node in which restriction conditions are imposed on connectivity among ports within the restricted node, the path search apparatus 40 according to the second embodiment is capable of appropriately reconfiguring a pair of link-disjoint paths that satisfy the restriction conditions.

Path search apparatus 40 may be implemented by providing a known information processing apparatus with the above mentioned functional units: first search unit 60, topology change unit 61, port change unit 62, second search unit 63, disjoint path reconfiguring unit 64, and output unit 65. Here, known information processing apparatuses may include a personal computer, a work station, a cell-phone, a PHS terminal, and a mobile communication terminal.

In the example according to the above second embodiment, topology information is temporarily changed so that the first path is not searched for as a path having the minimum total link-cost among the plurality of paths. Here, it is also possible to temporarily change the topology information so that a first path and paths intersecting with the first path are not searched for as a path having the minimum total link-cost among the plurality of paths. In the case, it is possible to reconfigure a pair of node-disjoint paths that shares no nodes with each other. In the third embodiment, description will be given of an example in which the topology information is changed so that a first path and paths intersecting with the first path are not searched for as a path having the minimum total link-cost.

Figure 13:
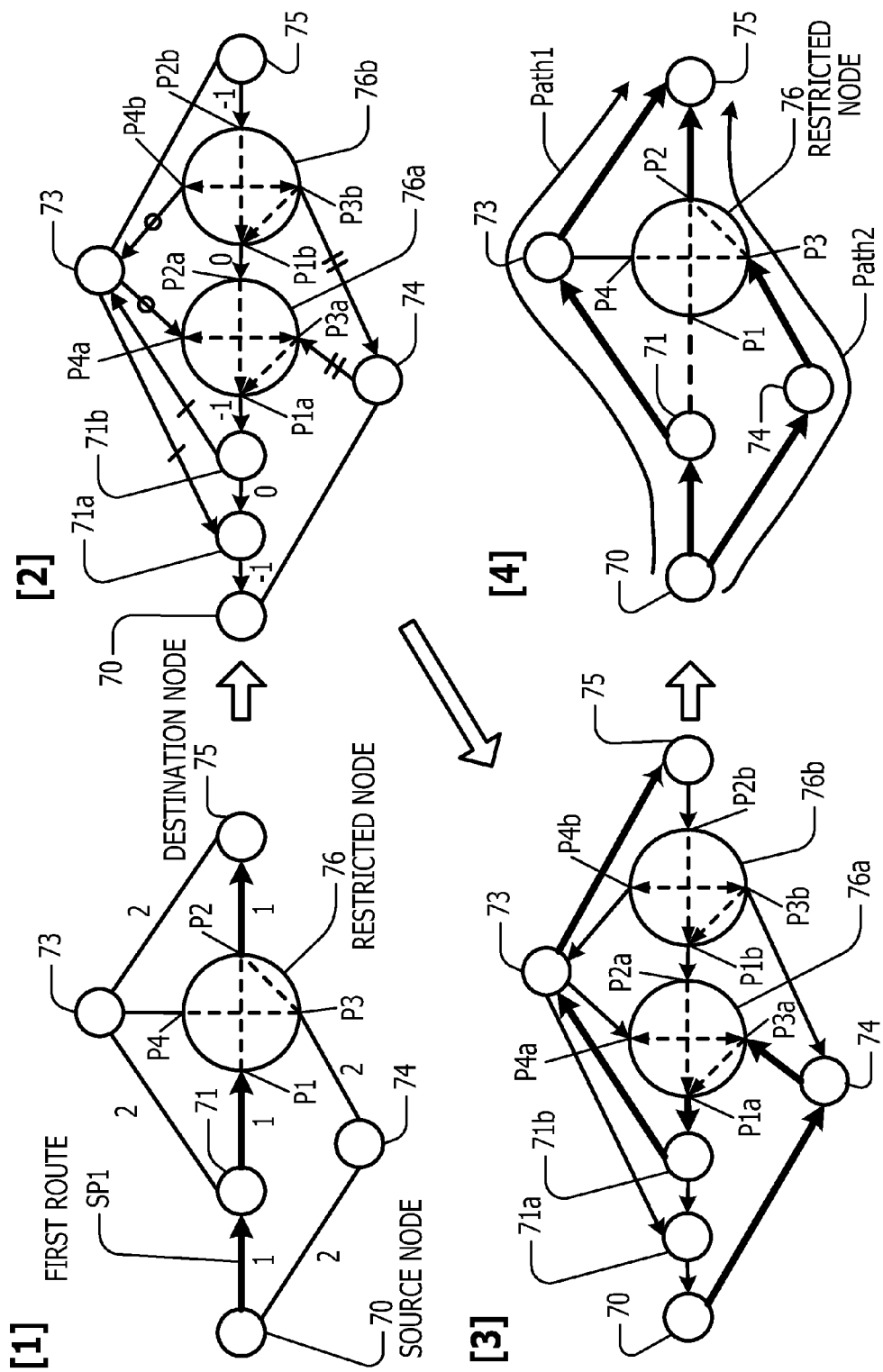
FIG. 13 is a diagram illustrating an example of a path search method performed by a path search apparatus, according to an embodiment.

First, description will be given of a path search method performed by a path search apparatus according to a third embodiment. FIG. 13 is a diagram illustrating an example of a path search method performed by a path search apparatus according to a third embodiment, in which a process for reconfiguring a pair of disjoint paths is schematically depicted, in association with link-costs and directions stored in topology information and restriction conditions imposed on connectivity among ports within a restricted node. Hereafter, description will be given of an example in which a pair of node-disjoint paths passing from source node 70 to destination node 75 is reconfigured by a path search apparatus.

Here, it is assumed that a network depicted in FIG. 13 includes a restricted node 76 in which restriction conditions are imposed on connectivity among ports P1 to P4. In the case, it is assumed that destination node 75 is capable of communicating with both node 71 and node 74 via node 76, and data transmission between node 71 and node 74 via node 76 is inhibited.

According to the embodiment, a path search apparatus searches a plurality of paths passing from source node 70 to destination node 75, for a first path having the minimum total link-cost, based on topology information that indicates connection states among nodes in the network (refer to [1] of FIG. 13). Here, in the initial state, all the links in the network are defined as bidirectional links in the topology information, and a link cost of a link is expressed, if needed, as a signed integer beside the link as depicted in FIG. 13. In the example of FIG. 13, the path search apparatus searches for, as a first path, path SP1 "source node 70-->node 71-->restricted node 76-->destination node 75" that has the minimum total link-cost "3".

Next, the path search apparatus temporarily changes the topology information so that the first path SP1 that has been found and paths intersecting with the first path SP1 are not searched for as a path having the minimum total link-cost among the plurality of paths. In the example of FIG. 13, the path search apparatus reverses the signs of link-costs along the first path SP1 in the original topology information, and reverses the directions of links along the first path SP1 in the original topology information.

Further, in the example of FIG. 13, the path search apparatus divide node 71 and restricted node 76 into two sub-nodes, respectively. That is, the path search apparatus divides node 71 into two sub-nodes 71a and 71b, and divides restricted node 76 into two sub-nodes 76a and 76b. Then the path search apparatus connects sub-nodes 71a and 71b via a new link, and connects sub-nodes 76a and 76b via another new link, where the new links each has link-cost "0" and has direction of data transmission opposite to that of the first path SP1. Further, the path search apparatus splits an intersecting link that connects a node positioned along the first path SP1 and an external node positioned outside the first path SP1, into two new links having the same link-cost as the intersecting link and having opposite directions each other. In the example of FIG. 13, the path search apparatus splits an intersecting link that connects node 71 along the first path SP1 and external node 73, into two links having the same link-cost as the intersecting link and having opposite directions each other. The intersecting link between restricted node 76 and external node 73, and the intersecting link between restricted node 76 and external node 74, are also respectively split into two links in the similar manner. By temporarily changing the topology information as mentioned above, it is possible to prevent paths intersecting with the first path SP1 from being searched for as a path having the minimum total link cost among the plurality of paths.

Further, the path search apparatus changes port information that indicates restriction conditions imposed on connectivity among ports P1 to P4 within restricted node 76 positioned along the first path SP1, based on a port connectivity change rule, so that a path not satisfying the restriction conditions is not reconfigured as a pair of node-disjoint paths (refer to [2] of FIG. 13). In the example of FIG. 13, based on the port connectivity change rule, when allowing connection between ports P1 and P2 via which source-side node 71 and destination-side node 75 are connected, the port change unit temporarily changes the port information so as to allow data transmission in the direction from destination-side node 75 to source-side node 71. When allowing connection between ports P2 and P3 via which destination-side node 75 and external node 74 are connected, the path search apparatus changes the port information so as to allow data transmission in the direction from external node 74 to source-side node 71. Further, when allowing connection between ports P3 and P4 via which external node 73 and external node 74 are connected, the path search apparatus changes the port information so as to allow data transmission in both the directions from external node 74 to external 73 and from external node 73 to external node 74.

Next, the path search apparatus search the plurality of paths for a second path different from the first path SP1, based on the changed topology information and the changed port information (refer to [3] of FIG. 13). In the example of FIG. 13, the path search apparatus finds, as second path SP2, the path "source node 70-->node 74-->restricted node 76 (sub-node 76a)-->node 71 (sub-node 71b)-->node 73-->destination node 75" that has the minimum total link-cost "7".

Next, the path search apparatus reconfigures, based on the original topology information, a pair of node-disjoint paths passing from source node 70 to destination node 75, by removing common links that are shared by both the two paths SP1 and SP2 (refer to [4] of FIG. 13). In the example of FIG. 13, the path search apparatus removes the link between node 71 and restricted node 76, and reconfigures a pair of node-disjoint paths: Path1 "source node 70-->node 71-->node 73-->destination node 75" and Path2 "source node 70-->node 74-->restricted node 76-->destination node 75".

Out of the pair of node-disjoint paths (Path1 and Path2), the disjoint path Path2 includes restricted node 76. However, in the case, the Path2 is an appropriate disjoint path since the Path2 satisfies restriction conditions imposed on connectivity among ports within restricted node 76.

As mentioned above, in a path search method according to the third embodiment, a second path different from the first path is searched for based on the changed topology and the changed port information, in a manner similar to the second embodiment. Therefore, in the path search method according to the third embodiment, even in a network including a restricted node in which restriction conditions are imposed on connectivity among ports within the restricted node, a pair of node-disjoint paths satisfying the restriction conditions may be appropriately reconfigured in a manner similar to the second embodiment.

Furthermore, in the path search method according to the third embodiment, topology information is temporarily changed so that a first path and paths intersecting with the first path are not searched for as a path having the minimum total link-cost among the plurality of paths. As a result, it is possible to reconfigure a pair of node-disjoint paths that share neither links nor nodes with each other.

Figure 14:
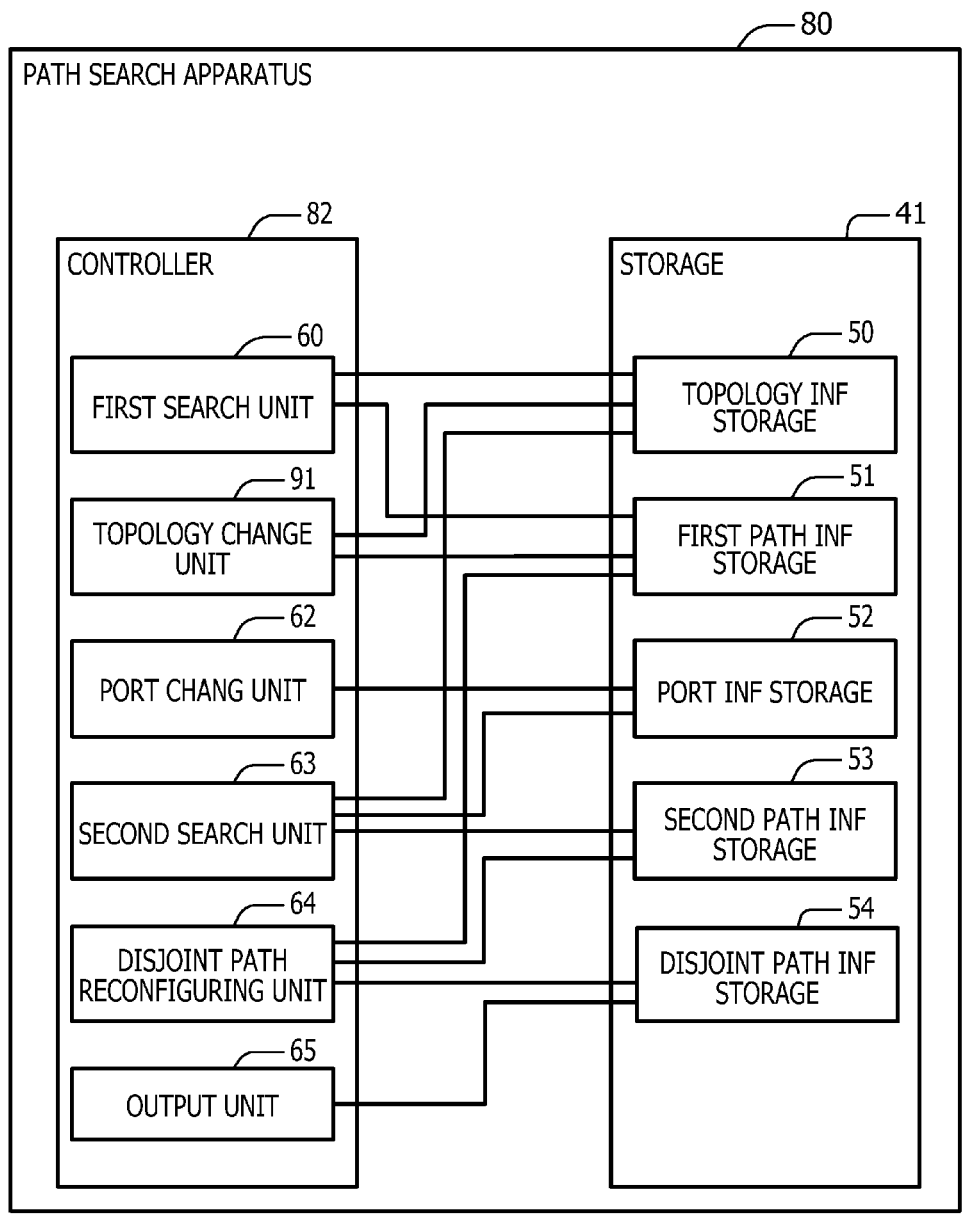
FIG. 14 is a diagram illustrating an example of a configuration of a path search apparatus, according to an embodiment.

FIG. 14 is a diagram illustrating an example of a configuration of a path search apparatus, according to a third embodiment. In FIG. 14, units similar to those described in the second embodiment are assigned the same reference numbers as the second embodiment, and details of them will be omitted here.

As depicted in FIG. 14, path search apparatus 80 includes storage 41 and controller 82. Controller 82 includes first search unit 60, topology change unit 91, port change unit 62, second search unit 63, disjoint path reconfiguring unit 64, and output unit 65.

Topology change unit 91 temporarily changes topology information so that a first path and paths intersecting with the first path are searched for as a path having the minimum total link-cost among the plurality of paths. For example, topology change unit 91 reads out from first path information storage 51 the node arrangement "N1-->N2-->N3-->N5" of the first path (identified by first path ID "SP1") that has been already found.

Figure 15:
FIG. 15 is a diagram illustrating an example of processing performed by a topology change unit, according an embodiment.

FIG. 15 is a diagram illustrating an example of processing performed by topology change unit 91, according an embodiment. In FIG. 15, reference numbers assigned to nodes in FIG. 13 are added to node identifiers of "NODE1" and "NODE2" in parentheses for reference.

Topology change unit 91 reverses the directions of links connecting nodes included in node arrangement (for example, links identified by link ID "L1", "L3", and "L5"), as well as the signs of link-costs of the first path, so that the directions of links of the first path in the changed topology information are opposite to the directions of the links of the first path in the original topology information. With the above mentioned change in the topology information, it is possible to prevent the first path from being searched for as a path having the minimum total link-cost among the plurality of paths.

Further, topology change unit 91 divides each of nodes other than source node and destination node (for example, N2 (71) and N3 (76)) included in the node arrangement, into two sub-nodes (for example, two sub-nodes: N2a (71a) and N2b (71b), and two sub-nodes: N3a (76a) and N3b (76b)). Then, topology change unit 91 connects the divided two sub-nodes via a new link (for example, links identified by link ID "L8" and "L9") that has a link-cost "0" and has the direction opposite to that of the first path. At the same time, topology change unit 91 splits a intersecting link connecting a node that is included in the node arrangement and different from source and destination nodes, and an external node that is not included in the node arrangement, into two new links (for example, two links "L4a" and "L4b", and two links "L6a" and "L6b") that have the same cost as the intersecting link and have opposite directions each other. In this way, a first path and the intersecting paths intersecting with the first path may be prevented from being searched for as a path having the minimum total link-cost among the plurality of paths in the network.

Figure 16:
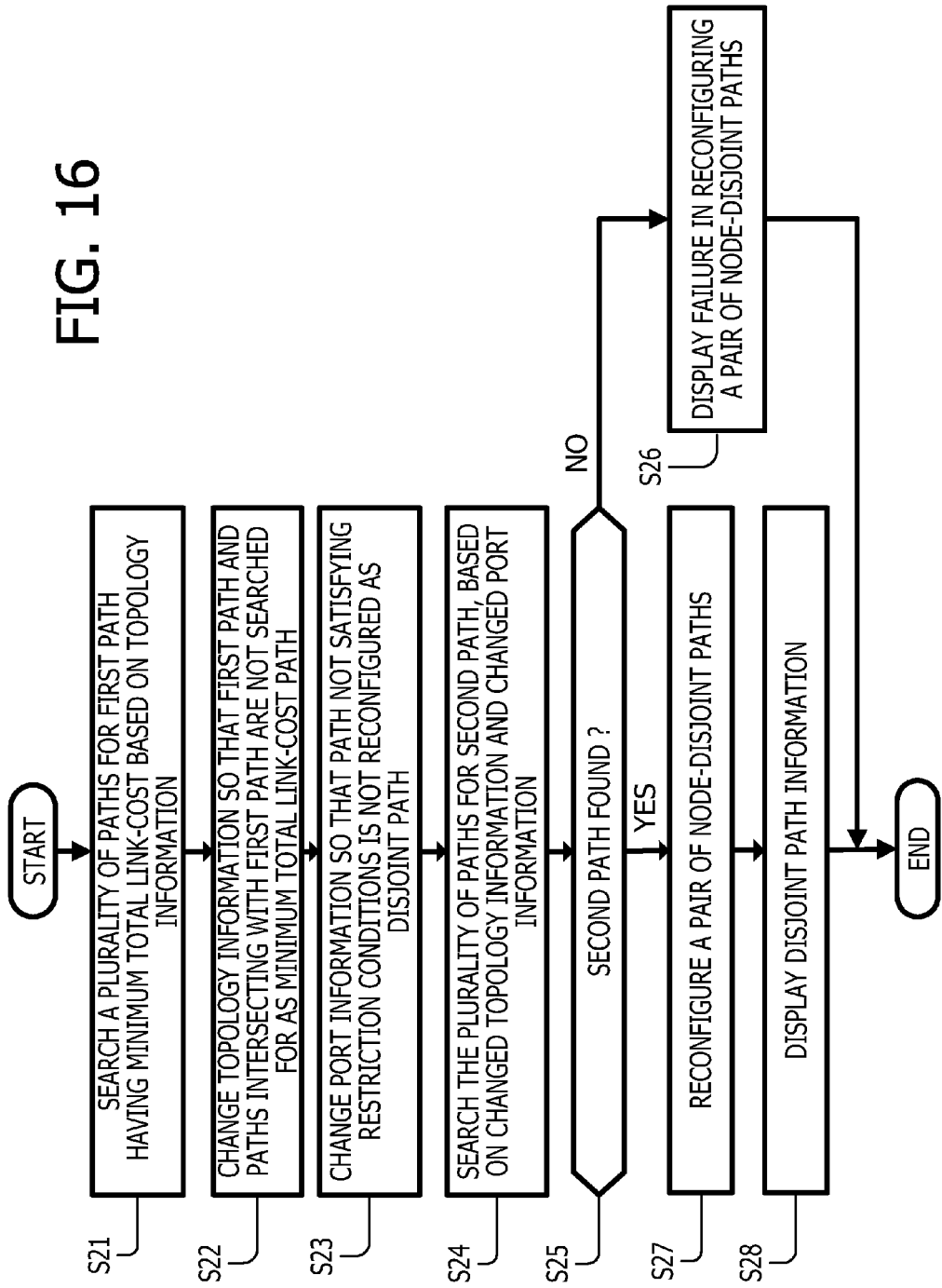
FIG. 16 is a diagram illustrating an example of an operational flowchart of path search processing performed by a path search apparatus, according to an embodiment.

FIG. 16 is a diagram illustrating an example of an operational flowchart of path search processing performed by path search apparatus 80, according to a third embodiment. Here, since operations S21, S23-S28 are similar to the operations S11, S13-S18 of FIG. 12, description about them is omitted.

As depicted in FIG. 16, first search unit 60 searches the plurality of paths for a first path (in operation S21). Then, topology change unit 91 temporarily changes topology information so that a first path and paths intersecting with the first path are not searched for as a path having the minimum total link-cost among the plurality of paths in the network (in operation S22).

Here, it is also possible to interchange operations S22 and S23 in the flowchart depicted in FIG. 16.

As mentioned above, path search apparatus 80 according to the third embodiment searches for a second path different from the first path, based on the changed topology information and the changed port information, in a manner similar to the second embodiment. Therefore, even in a network including a node in which restriction condition is imposed on connectivity among ports within the node, path search apparatus 80 according to the third embodiment is capable of appropriately reconfiguring a pair of link-disjoint paths satisfying the restriction conditions.

Furthermore, path search apparatus 80 changes topology information so that a first path and paths intersecting with the first path are not searched for as a path having the minimum total link-cost among the plurality paths in the network. As a result, path search apparatus 80 according to the third embodiment is capable of appropriately reconfiguring a pair of node-disjoint paths satisfying the restriction conditions, where not only links but also nodes are disjoint.

In the example described above, the present invention was applied to an optical network including a restricted node in which restriction conditions are imposed on connectivity among ports within the restricted node. However, the present invention is not limited to the optical network, and may be applied to a variety of networks including one or more restricted nodes.

In the example described above, topology and port information was configured to be input by users. However, the topology information and the port information may be configured to be collected from each node in a network during the time when the network is being operated. In the case, disjoint path information stored in disjoint path information storage 54 and the notification indicating failure in reconfiguring a pair of disjoint paths, which is received from disjoint path reconfiguring unit 64, may be sent to each node in the network as the processing result of the path search apparatus.

Each element included in an apparatus depicted in the above mentioned figures means a functional unit or a conceptional unit. Therefore, it is not necessarily the case that the apparatus is physically configured as depicted in the above mentioned figures. That is, distributed and integrated configurations of each apparatus are not limited to the configuration depicted in the above figures, and the apparatuses may be distributed or integrated, functionally or physically, in an arbitrary unity. For example, in the example depicted in FIG. 3, first search unit 60 and topology change unit 61 may be integrated.

Each of processes described in the above embodiments may be implemented by a computer that executes programs provided beforehand. Hereafter, as another embodiment, description will be given of a computer that executes programs having functions similar to those of the above mentioned embodiment.

Figure 17:
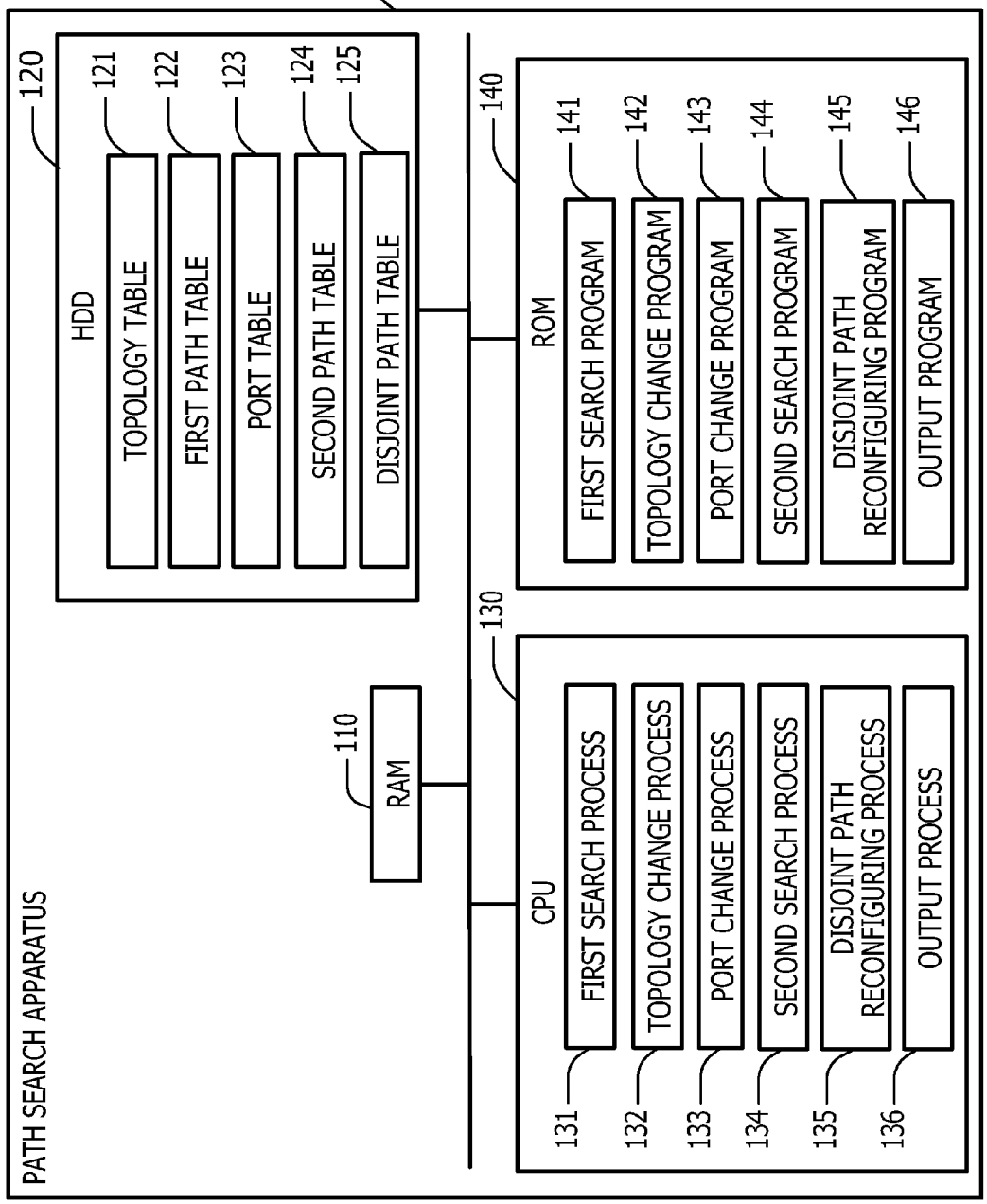
FIG. 17 is a diagram illustrating an example of a configuration of a computer executing a path search program, according to an embodiment.

FIG. 17 is a diagram illustrating an example of a configuration of a computer executing a path search program, according to an embodiment. As depicted in FIG. 17, a computer 100, functioning as a path search apparatus, includes, for example, RAM 110, HDD 120, ROM 140, and CPU 130. Here, in ROM 140, programs capable of exerting functions similar to those of the above mentioned embodiments are stored beforehand. In other words, ROM 140 beforehand stores first search program 141, topology change program 142, port change program 143, second search program 144, disjoint path reconfiguring program 145, and output program 146, as depicted in FIG. 17.

These programs 141 to 146 are loaded and executed by CPU 130, so as to function as first search process 131, topology change process 132, port change process 133, second search process 134, disjoint path reconfiguring process 135, and output process 136, respectively, as depicted in FIG. 17. Here, processes 131 to 136 correspond to first search unit 60, topology change unit 61, port change unit 62, second search unit 63, disjoint path reconfiguring unit 64, and output unit 65 of FIG. 3, respectively. As depicted in FIG. 17, HDD 120 may be configured to store topology table 121, first path table 122, port table 123, second path table 124, and disjoint path table 125 that correspond to topology information storage 50, first path information storage 51, port information storage 52, second path information storage 53, and disjoint path information storage 54 of FIG. 3, respectively.

Meanwhile, the above mentioned programs 141 to 146 not always have to be stored in ROM 140. For example, the programs 141 to 146 may be stored in portable physical media, a fixing physical medium such as a hard disk drive (HDD) provided inside or outside computer 100, and another computer connected to computer 100 via public line, the Internet, LAN, and WAN, so that computer 100 load programs from the above media and executes the loaded programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An apparatus for finding a pair of disjoint paths in a network, comprising:
   topology information including, for each link connecting a pair of nodes in the network, a link identifier identifying the pair of nodes, a link-cost assigned to the each link, and direction of data transmission;
   a first search unit configured to find a first path having the minimum total link-cost by searching, based on the topology information, a plurality of paths passing from a source node to a destination node in the network;
   port information including, for each restricted node along the first path, one or more restriction conditions on connectivity among ports within the each restricted node, the each restricted node being a node in which the one or more restriction conditions are imposed on connectivity among ports within the node;
   a topology change unit configured to change the topology information so that the first path is not searched for as a path having the minimum total link-cost among the plurality of paths;
   a port change unit configured to change the port information based on a port connectivity change rule;
   a second search unit configured to find a second path having the minimum total link-cost by searching the plurality of paths, based on the changed port information and the changed topology information; and
   a disjoint path reconfiguring unit configured to reconfigure a pair of link-disjoint paths that do not share a link with each other and satisfy the one or more restriction conditions imposed on connectivity among ports within the restricted node, by removing a link shared by both the first and second paths from the original topology information.

2. The apparatus of claim 1, wherein the port connectivity change rule requires that,
   when allowing connection between a first pair of ports that are within the restricted node and positioned along the first path, the port information is changed so as to allow data transmission from a destination-side node to a source-side node via the first pair of ports, the destination-side node being a node that is along the first path and adjacent to the restricted node toward the destination node of the first path, the source-side node being a node that is along the first path and adjacent to the restricted node toward the source node of the first path.

3. The apparatus of claim 2, wherein the port connectivity change rule further requires that,
   when allowing connection between a second pair of ports that are within the restricted node and positioned along a route connecting the source-side node and an external node of the first path via the restricted node, the port information is changed so as to allow data transmission from the destination-side node to the external node via a third pair of ports, the external node being a node that is adjacent to the restricted node and positioned outside the first path, the third pair of ports being a pair of ports that are within the restricted node and positioned along a route connecting the destination-side node and the external node of the first path via the restriction node.

4. The apparatus of claim 2, wherein the port connectivity change rule further requires that,
   when allowing connection between a third pair of ports that are within the restricted node and positioned along a route connecting the destination-side node and an external node of the first path via the restricted node, the port information is changed so as to allow data transmission from the external node to the source-side node via a second pair of ports, the external node being a node that is adjacent to the restricted node and positioned outside the first path, the second pair of ports being a pair of ports that are within the restricted node and positioned along a route connecting the external node and the source-side node via the restricted node.

5. The apparatus of claim 1, wherein the topology change unit changes the topology information so that the first path and paths intersecting with the first path are not searched for as a path having the minimum total link-cost among the plurality of paths; and the path reconfiguring unit reconfigures a pair of node-disjoint paths that share neither a link nor a node with each other and satisfy the one or more restriction conditions imposed on connectivity among ports within the restricted node, by removing a link shared by both the first and second paths from the original topology information.

6. A method for finding a pair of disjoint paths in a network, the method being performed by a path search apparatus, comprising:

providing the path search apparatus with topology information storing, for each link connecting a pair of nodes in the network, a link identifier identifying the pair of nodes, a link-cost assigned to the each link, and direction of data transmission;

providing the path search apparatus with port information including, for each restricted node, one or more restriction conditions on connectivity among ports within the each restricted node, the each restricted node being a node in which the one or more restriction conditions are imposed on connectivity among ports within the node;

finding, by the path search apparatus, a first path having the minimum total link-cost by searching, based on the topology information, a plurality of paths passing from a source node to a destination node in the network;

changing, by the path search apparatus, the topology information so that the first path is not searched for as a path having the minimum total link-cost among the plurality of paths;

changing, by the path search apparatus, the port information based on a port connectivity change rule;

finding, by the path search apparatus, a second path having the minimum total link-cost by searching the plurality of paths, based on the changed port information and the changed topology information; and reconfiguring a pair of link-disjoint paths that do not share a link with each other and satisfy the one or more restriction conditions imposed on connectivity among ports within the restricted node, by removing a link shared by both the first and second paths from the original topology information.

7. The method of claim 6, wherein the port connectivity change rule requires that, when allowing connection between a first pair of ports that are within the restricted node and positioned along the first path, the port information is changed so as to allow data transmission from a destination-side node to a source-side node via the first pair of ports, the destination-side node being a node on the first path that is adjacent to the restricted node toward the destination node of the first path, the source-side node being a node on the first path that is adjacent to the restricted node toward the source node of the first path.

8. The method of claim 7, wherein the port connectivity change rule further requires that, when allowing connection between a second pair of ports that are within the restricted node and positioned along a route connecting the source-side node and an external node of the first path via the restricted node, the port information is changed so as to allow data transmission from the destination-side node to the external node via a third pair of ports, the external node being a node that is adjacent to the restricted node and positioned outside the first path, the third pair of ports being a pair of ports that are within the restricted node and positioned along a route connecting the destination-side node and the external node of the first path via the restriction node.

9. The method of claim 7, wherein the port connectivity change rule further requires that, when allowing connection between a third pair of ports that are within the restricted node and positioned along a route connecting the destination-side node and an external node of the first path via the restricted node, the port information is changed so as to allow data transmission from the external node to the source-side node via a second pair of ports, the external node being a node that is adjacent to the restricted node and positioned outside the first path, the second pair of ports being a pair of ports that are within the restricted node and positioned along a route connecting the external node and the source-side node via the restricted node.

10. The method of claim 6, wherein the topology information is changed so that the first path and paths intersecting with the first path are not searched for as a path having the minimum total link-cost among the plurality of paths; and a pair of node-disjoint paths are reconfigured that share neither a link nor a node with each other and satisfy the one or more restriction conditions imposed on connectivity among ports within the restricted node, by removing a link shared by both the first and second paths from the original topology information.

11. A non-transitory computer readable medium storing instructions for allowing computer system to execute a method for finding a pair of disjoint paths in a network, the method comprising:

providing topology information including, for each link connecting a pair of nodes in the network, a link identifier identifying the pair of nodes, a link-cost assigned to the each link, and direction of data transmission;

providing port information including, for each restricted node, one or more restriction conditions on connectivity among ports within the each restricted node, the each restricted node being a node in which the one or more restriction conditions are imposed on connectivity among ports within the node;

finding a first path having the minimum total link-cost by searching, based on topology information, a plurality of paths that pass from a source node to a destination node in the network;

changing the topology information so that the first path is not searched for as a path having the minimum total link-cost among the plurality of paths;

changing the port information based on a port connectivity change rule;

finding a second path having the minimum total link-cost by searching the plurality of paths, based on the changed port information and the changed topology information; and reconfiguring a pair of link-disjoint paths that do not share a link with each other and satisfy the one or more restriction conditions imposed on connectivity among ports within the restricted node, by removing a link shared by both the first and second paths from the original topology information.

12. The non-transitory computer readable medium of claim 11, wherein the port connectivity change rule requires that, when allowing connection between a first pair of ports that are within the restricted node and positioned along the first path, the port information is changed so as to allow data transmission from a destination-side node to a source-side node via the first pair of ports, the destination-side node being a node on the first path that is adjacent to the restricted node toward the destination node of the first path, the source-side node being a node on the first path that is adjacent to the restricted node toward the source node of the first path.

13. The non-transitory computer readable medium of claim 12, wherein the port connectivity change rule further requires that, when allowing connection between a second pair of ports that are within the restricted node and positioned along a route connecting the source-side node and an external node of the first path via the restricted node, the port information is changed so as to allow data transmission from the destination-side node to the external node via a third pair of ports, the external node being a node that is adjacent to the restricted node and positioned outside the first path, the third pair of ports being a pair of ports that are within the restricted node and positioned along a route connecting the destination-side node and the external node of the first path via the restriction node.

14. The non-transitory computer readable medium of claim 12, wherein the port connectivity change rule further requires that, when allowing connection between a third pair of ports that are within the restricted node and positioned along a route connecting the destination-side node and an external node of the first path via the restriction node, the port information is changed so as to allow data transmission from the external node to the source-side node via a second pair of ports, the external node being a node that is adjacent to the restricted node and positioned outside the first path, the second pair of ports being a pair of ports that are within the restricted node and positioned along a route connecting the external node and the source-side node via the restricted node.

15. The non-transitory computer readable medium of claim 11, wherein the topology information is changed so that the first path and paths intersecting with the first path are not searched for as a path having the minimum total link-cost among the plurality of paths; and a pair of node-disjoint paths are reconfigured that share neither a link nor a node with each other and satisfy the one or more restriction conditions imposed on connectivity among ports within the restricted node, by removing a link shared by both the first and second paths from the original topology information.

* * * * *